United States Patent [19]

Inuzuka et al.

[11] Patent Number: 5,206,635
[45] Date of Patent: Apr. 27, 1993

[54] METHOD AND APPARATUS FOR MULTI-LEVEL TONE DISPLAY FOR LIQUID CRYSTAL APPARATUS

[75] Inventors: Tatsuhiro Inuzuka; Hiroyuki Mano; Kazuhiro Fujisawa; Satoshi Konuma, all of Kanagawa; Kiyoshige Kinugawa, Chiba; Satoru Tsunekawa, Tokyo, all of Japan

[73] Assignees: Hitachi, Ltd., Tokyo; Hitachi Engineering Inc., Kanagawa, both of Japan

[21] Appl. No.: 472,306

[22] Filed: Jan. 30, 1990

[30] Foreign Application Priority Data

Jan. 30, 1989 [JP] Japan .................................. 1-017658

[51] Int. Cl.⁵ .............................................. G09G 3/36
[52] U.S. Cl. ...................................... 340/784; 340/793
[58] Field of Search ............... 340/784, 793, 745, 750, 340/799; 358/236, 56, 59

[56] References Cited

U.S. PATENT DOCUMENTS

| | | | |
|---|---|---|---|
| 4,709,995 | 12/1987 | Kuribayashi et al. | 340/793 |
| 4,779,083 | 10/1988 | Ishii et al. | 340/784 |
| 4,908,710 | 3/1990 | Wakai et al. | 340/784 |
| 5,053,764 | 10/1991 | Barbier et al. | 340/793 |

FOREIGN PATENT DOCUMENTS 0260488 10/1989 Japan .................................. 340/784

*Primary Examiner*—Jeffery A. Brier
*Attorney, Agent, or Firm*—Antonelli, Terry, Stout & Kraus

[57] ABSTRACT

A liquid crystal display apparatus including a liquid crystal panel of a plurality of dots, an X drive circuit for supplying display information of at least one line to the liquid crystal panel and a Y drive circuit for selecting one-dot data for each line of the liquid crystal panel, the X drive circuit and the Y drive circuit enabling energization of the liquid crystal panel. A plurality of memories are provided for receiving a plurality of bits of information data and for storing at least M dot display information data so as to enable display of a respective line of the liquid crystal panel, M being an integer. A selection arrangement is provided for selecting one bit of display information data out of a plurality of bits of display information data to be read out of the memories and a selection controller is provided for specifying the one bit of display information data to be selected by the selection arrangement so as to enable read out of each one bit of the plurality of bits in a predetermined time sequence corresponding to one horizontal perioid divided by N for display, where N is an integer of at least two. The X drive circuit is supplied one dot information at leat two times during the one horizontal period so that one dot is controlled for display at least two times during the one horizontal period to enable multi-level tone display.

14 Claims, 30 Drawing Sheets

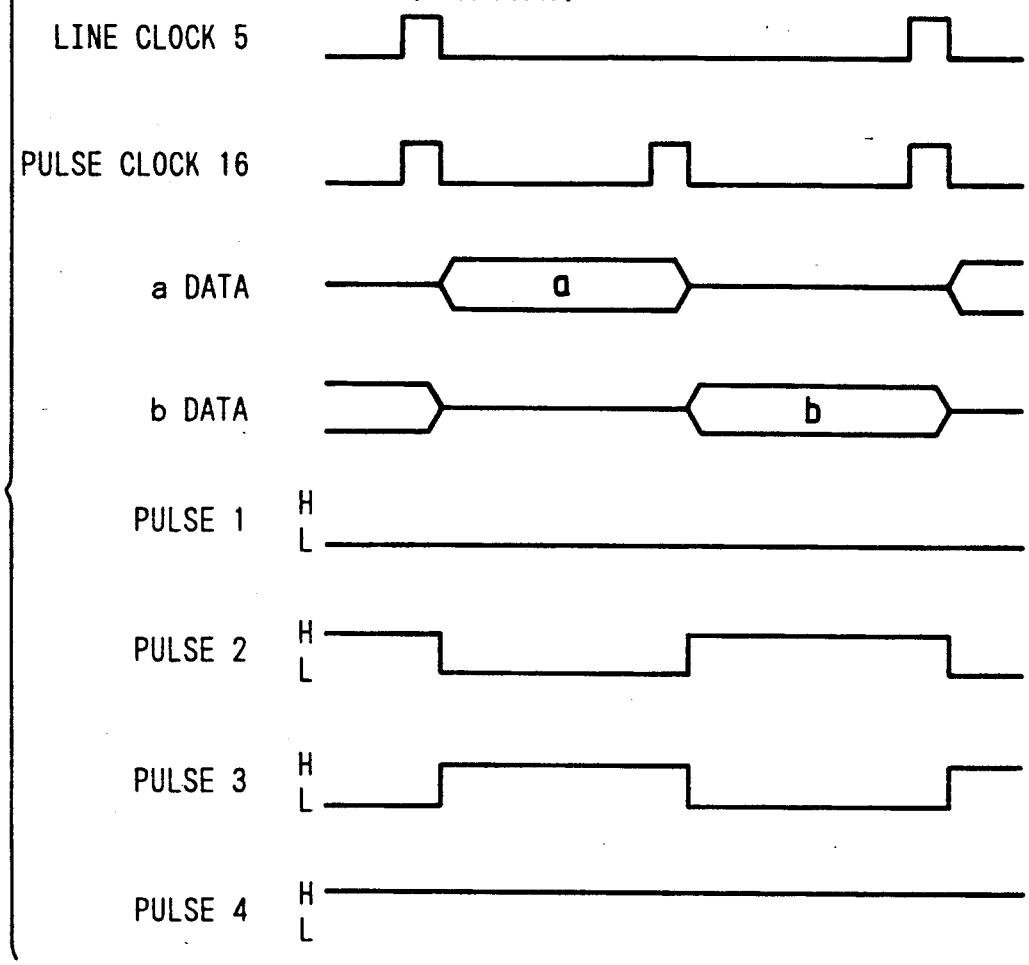

FIG. 7

|  | ODD FRAME | | EVEN FRAME | |
|---|---|---|---|---|
|  | X ODD DOT | X EVEN DOT | X ODD DOT | X EVEN DOT |
| ODD LINE | — | ○ | ○ | — |
| EVEN LINE | ○ | — | — | ○ |

FIG. 8

|  | ODD FRAME | | | | EVEN FRAME | | | |
|---|---|---|---|---|---|---|---|---|
|  | X ODD DOT | | X EVEN DOT | | X ODD DOT | | X EVEN DOT | |
|  | $X_A$ | $X_B$ | $X_A$ | $X_B$ | $X_A$ | $X_B$ | $X_A$ | $X_B$ |
| ODD LINE | 0 | 1 | 1 | 0 | 1 | 0 | 0 | 1 |
| EVEN LINE | 1 | 0 | 0 | 1 | 0 | 1 | 1 | 0 |

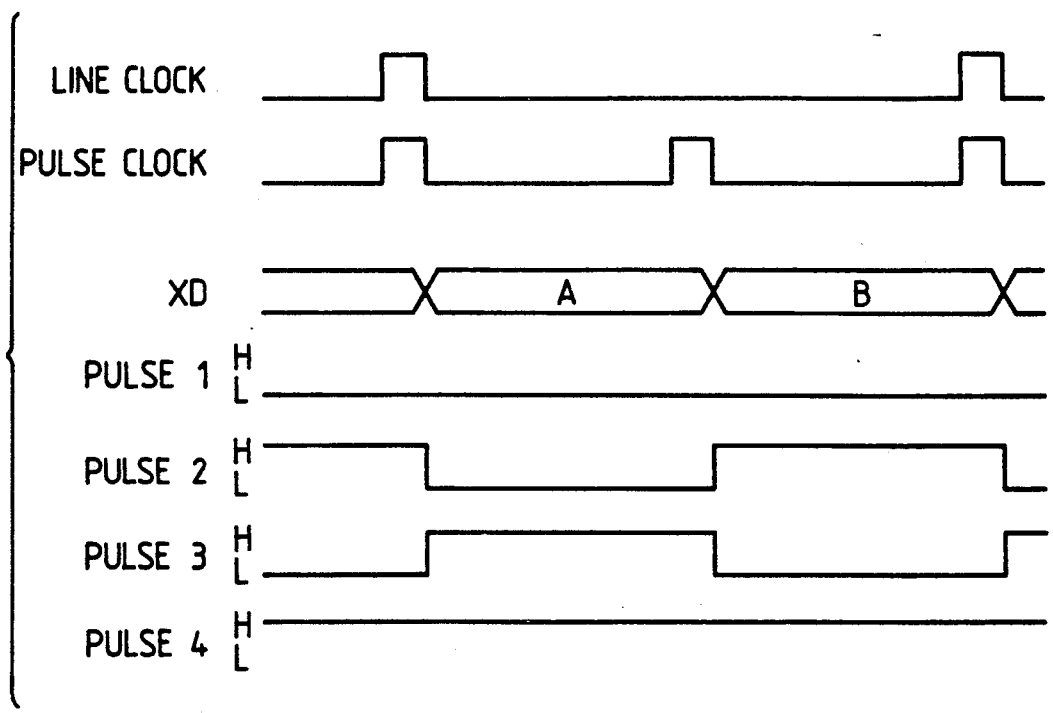

FIG. 20

|       | FRAME 1 ||| FRAME 2 ||| FRAME 3 |||
|       | DOT X1 | DOT X2 | DOT X3 | DOT X1 | DOT X2 | DOT X3 | DOT X1 | DOT X2 | DOT X3 |
|---|---|---|---|---|---|---|---|---|---|
| LINE 1 | — | △ | ○ | △ | ○ | — | ○ | — | △ |
| LINE 2 | ○ | — | △ | — | △ | ○ | △ | ○ | — |
| LINE 3 | △ | ○ | — | ○ | — | △ | — | △ | ○ |

FIG. 21

| | FRAME 1 | | | | | | | | | FRAME 2 | | | | | | | | | FRAME 3 | | | | | | | | |
|---|---|---|---|---|---|---|---|---|---|---|---|---|---|---|---|---|---|---|---|---|---|---|---|---|---|---|---|
| | DOT X1 | | | DOT X2 | | | DOT X3 | | | DOT X1 | | | DOT X2 | | | DOT X3 | | | DOT X1 | | | DOT X2 | | | DOT X3 | | |
| | $X_A$ | $X_B$ | $X_C$ | $X_A$ | $X_B$ | $X_C$ | $X_A$ | $X_B$ | $X_C$ | $X_A$ | $X_B$ | $X_C$ | $X_A$ | $X_B$ | $X_C$ | $X_A$ | $X_B$ | $X_C$ | $X_A$ | $X_B$ | $X_C$ | $X_A$ | $X_B$ | $X_C$ | $X_A$ | $X_B$ | $X_C$ |
| LINE 1 | 0 | 0 | 1 | 0 | 1 | 0 | 1 | 0 | 0 | 1 | 0 | 0 | 0 | 0 | 1 | 0 | 0 | 1 | 0 | 0 | 0 | 0 | 0 | 1 | 0 | 1 | 0 |
| LINE 2 | 1 | 0 | 0 | 0 | 0 | 1 | 0 | 1 | 0 | 0 | 1 | 0 | 1 | 0 | 0 | 0 | 1 | 0 | 1 | 1 | 0 | 1 | 0 | 0 | 0 | 0 | 1 |
| LINE 3 | 0 | 1 | 0 | 1 | 0 | 0 | 0 | 0 | 1 | 0 | 0 | 1 | 0 | 1 | 0 | 1 | 0 | 0 | 0 | 0 | 1 | 0 | 1 | 0 | 1 | 0 | 0 |

FIG. 22

| | FRAME 1 | | | | | | | | | FRAME 2 | | | | | | | | | FRAME 3 | | | | | | | | |
|---|---|---|---|---|---|---|---|---|---|---|---|---|---|---|---|---|---|---|---|---|---|---|---|---|---|---|---|
| | DOT X1 | | | DOT X2 | | | DOT X3 | | | DOT X1 | | | DOT X2 | | | DOT X3 | | | DOT X1 | | | DOT X2 | | | DOT X3 | | |
| | $X_A$ | $X_B$ | $X_C$ | $X_A$ | $X_B$ | $X_C$ | $X_A$ | $X_B$ | $X_C$ | $X_A$ | $X_B$ | $X_C$ | $X_A$ | $X_B$ | $X_C$ | $X_A$ | $X_B$ | $X_C$ | $X_A$ | $X_B$ | $X_C$ | $X_A$ | $X_B$ | $X_C$ | $X_A$ | $X_B$ | $X_C$ |
| LINE 1 | 0 | 1 | 1 | 1 | 1 | 0 | 1 | 0 | 1 | 1 | 1 | 1 | 1 | 1 | 0 | 1 | 0 | 1 | 1 | 1 | 1 | 1 | 0 | 1 | 1 | 1 | 0 |
| LINE 2 | 1 | 0 | 1 | 0 | 1 | 1 | 1 | 1 | 0 | 1 | 0 | 1 | 1 | 1 | 1 | 0 | 1 | 1 | 0 | 1 | 1 | 0 | 1 | 1 | 0 | 1 | 1 |
| LINE 3 | 1 | 1 | 0 | 1 | 0 | 1 | 0 | 1 | 1 | 1 | 1 | 0 | 0 | 1 | 1 | 1 | 1 | 0 | 1 | 0 | 1 | 1 | 1 | 0 | 1 | 0 | 1 |

FIG. 26

| A | B | C | A | B |
|---|---|---|---|---|
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 1 |
| 1 | 1 | 0 | 1 | 1 |
| 1 | 1 | 1 | 1 | 1 |

FIG. 27

| | ODD FRAME | | | | | | EVEN FRAME | | | | | |
|---|---|---|---|---|---|---|---|---|---|---|---|---|
| | X ODD DOT | | | X EVEN DOT | | | X ODD DOT | | | X EVEN DOT | | |
| | $X_A$ | $X_B$ | $X_C$ | $X_A$ | $X_B$ | $X_C$ | $X_A$ | $X_B$ | $X_C$ | $X_A$ | $X_B$ | $X_C$ |
| ODD LINE | MA | MA | MB | MB | MA | MA | MB | MA | MA | MA | MA | MB |
| EVEN LINE | MB | MA | MA | MA | MA | MB | MA | MA | MB | MB | MA | MB |

FIG. 28

|  | ODD FRAME | | | | | | EVEN FRAME | | | | | |
| --- | --- | --- | --- | --- | --- | --- | --- | --- | --- | --- | --- | --- |
|  | X ODD DOT | | | X EVEN DOT | | | X ODD DOT | | | X EVEN DOT | | |
|  | $X_A$ | $X_B$ | $X_C$ | $X_A$ | $X_B$ | $X_C$ | $X_A$ | $X_B$ | $X_C$ | $X_A$ | $X_B$ | $X_C$ |
| ODD LINE | 0 | 0 | 1 | 1 | 0 | 0 | 1 | 0 | 0 | 0 | 0 | 1 |
| EVEN LINE | 1 | 0 | 0 | 0 | 0 | 1 | 0 | 0 | 1 | 1 | 0 | 0 |

FIG. 29

|  | ODD FRAME | | | | | | EVEN FRAME | | | | | |
| --- | --- | --- | --- | --- | --- | --- | --- | --- | --- | --- | --- | --- |
|  | X ODD DOT | | | X EVEN DOT | | | X ODD DOT | | | X EVEN DOT | | |
|  | $X_A$ | $X_B$ | $X_C$ | $X_A$ | $X_B$ | $X_C$ | $X_A$ | $X_B$ | $X_C$ | $X_A$ | $X_B$ | $X_C$ |
| ODD LINE | 0 | 1 | 1 | 1 | 1 | 0 | 1 | 1 | 0 | 0 | 1 | 1 |
| EVEN LINE | 1 | 1 | 0 | 0 | 1 | 1 | 0 | 1 | 1 | 1 | 1 | 0 |

| DISPLAY DATA | | | FRAME 1 | | FRAME 2 | | FRAME 3 | | FRAME 4 | |
|---|---|---|---|---|---|---|---|---|---|---|
| R | G | B | A | B | A | B | A | B | A | B |
| 0 | 0 | 0 | 0 | 0 | 0 | 0 | 0 | 0 | 0 | 0 |
| 0 | 0 | 1 | 0 | 1 | 0 | 0 | 0 | 1 | 0 | 0 |
| 0 | 1 | 0 | 0 | 1 | 0 | 1 | 0 | 1 | 0 | 0 |
| 0 | 1 | 1 | 0 | 1 | 0 | 1 | 0 | 1 | 0 | 1 |
| 1 | 0 | 0 | 1 | 1 | 0 | 1 | 0 | 1 | 0 | 1 |
| 1 | 0 | 1 | 1 | 1 | 0 | 1 | 1 | 1 | 0 | 1 |
| 1 | 1 | 0 | 1 | 1 | 1 | 1 | 1 | 1 | 0 | 1 |
| 1 | 1 | 1 | 1 | 1 | 1 | 1 | 1 | 1 | 1 | 1 |

| DISPLAY DATA | | | FRAME 1 | | | FRAME 2 | | | FRAME 3 | | |
|---|---|---|---|---|---|---|---|---|---|---|---|
| R | G | B | A | B | C | A | B | C | A | B | C |
| 0 | 0 | 0 | 0 | 0 | 0 | 0 | 0 | 0 | 0 | 0 | 0 |
| 0 | 0 | 1 | 0 | 0 | 1 | 0 | 0 | 1 | 0 | 0 | 0 |
| 0 | 1 | 0 | 0 | 0 | 1 | 0 | 0 | 1 | 0 | 0 | 1 |
| 0 | 1 | 1 | 0 | 1 | 1 | 0 | 0 | 1 | 0 | 0 | 1 |
| 1 | 0 | 0 | 0 | 1 | 1 | 0 | 1 | 1 | 0 | 0 | 1 |
| 1 | 0 | 1 | 0 | 1 | 1 | 0 | 1 | 1 | 0 | 1 | 1 |
| 1 | 1 | 0 | 1 | 1 | 1 | 0 | 1 | 1 | 0 | 1 | 1 |
| 1 | 1 | 1 | 1 | 1 | 1 | 1 | 1 | 1 | 1 | 1 | 1 |

FIG. 37

| DISPLAY DATA | | | FRAME 1 | | FRAME 2 | | FRAME 3 | |
|---|---|---|---|---|---|---|---|---|
| R | G | B | A | B | A | B | A | B |
| 0 | 0 | 0 | 0 | 0 | 0 | 0 | 0 | 0 |
| 0 | 0 | 1 | 0 | 1 | 0 | 1 | 0 | 0 |
| 0 | 1 | 0 | 0 | 1 | 0 | 1 | 0 | 1 |
| 0 | 1 | 1 | 1 | 0 | 0 | 1 | 0 | 1 |
| 1 | 0 | 0 | 1 | 0 | 1 | 0 | 0 | 1 |
| 1 | 0 | 1 | 1 | 0 | 1 | 0 | 1 | 0 |
| 1 | 1 | 0 | 1 | 1 | 1 | 0 | 1 | 0 |
| 1 | 1 | 1 | 1 | 1 | 1 | 1 | 1 | 1 |

METHOD AND APPARATUS FOR MULTI-LEVEL TONE DISPLAY FOR LIQUID CRYSTAL APPARATUS

BACKGROUND OF THE INVENTION

The present invention relates to a method and apparatus for multi-level tone display for a liquid crystal display apparatus.

A liquid crystal display apparatus disclosed in Japanese Patent Application Laid-open No. 59-149393 accomplishes three-level tone display by equally splitting the voltage pulse width in one horizontal period so that the voltage pulse applied to liquid crystal has its effective value varied. The conventional technique will be described with reference to FIGS. 1 to 3.

FIG. 1 shows an example of the liquid crystal display apparatus which accomplishes three-level tone display by controlling the pulse width, in one horizontal period, of the voltage pulse applied to the liquid crystal apparatus. A control circuit 100 generates two kinds of data of display information a and b for displaying a liquid crystal dot in one horizontal period. As seen in FIG. 2, the data a and b are not simultaneously supplied, but rather the data a is supplied during a first half of one horizontal period and the data b is supplied during the second half of the horizontal period. An X drive circuit 115 introduces data a in response to a data latch clock 7 and, after the drive circuit has introduced display data for one line by repeating the same operation, outputs liquid crystal application pulses corresponding to the data a onto signal lines X1, X2, ... Xi in response to a pulse clock 10 in the order of introduction. The pulse clock 10 equally splits the line clock 9 in every horizontal period. Next, in a similar manner, the X drive circuit introduces the data b in response to the data latch clock 7, and outputs liquid crystal application pulses corresponding to the data b onto the signal lines X1, X2, ... Xi in response to the pulse clock 10 in the order of introduction. A Y drive circuit 116 introduces a leading line clock 8 in response to the line clock 9 to produce a high state at line Y1, and in response to the successive line clocks 9 it shifts the high state to Y2, ... Yj. A liquid crystal panel 117 is an i-row by j-column matrix panel, and liquid crystal cells with the application of high-state pulses among X1, X2, ... Xi from the X drive circuit 115 and Y1, Y2, ... Yj from the Y drive circuit 116 are activated for display.

FIG. 2 shows the liquid crystal application pulse produced by the X drive circuit 115. During one horizontal period, the X drive circuit receives the display data a during the first half of the horizontal period and the display data b during the second half, and delivers one of four kinds of pulses, i.e., pulse 1 through pulse 4, selectively depending on the data a and b. FIG. 3 shows the correspondence between the display data a and b and the pulse from the X drive circuit.

With the display data a and b generated by the control circuit 100 being 0 and 0, the X drive circuit 115 delivers pulse 1 as a liquid crystal application pulse, and a display dot is inactivated. With the display data a and b being 1 and 1, the circuit 115 delivers pulse 4 to activate a display dot. With the display data A and B being 0 and 1, or 1 and 0, the circuit 15 delivers pulse 2 or pulse 3, respectively, producing an intermediate tone display between an active and inactive dot in both cases. The brightness (transmission factor) of the liquid crystal is dependent on the effective value of the voltage applied to it. Since the pulse clock 10 is obtained from equal splitting or division of the line clock 9, the pulse 2 and pulse 3 have an equal H period and thus an equal effective value in voltage. Consequently, the pulse 2 and pulse 3 provide an equal brightness of liquid crystal, which is an intermediate brightness between an active dot and inactive dot, resulting in the accomplishment of three-level tone display. Accordingly, the liquid crystal display apparatus shown in FIG. 1 is capable of tone display by varying the effective value of the voltage applied to the liquid crystal panel 117 through the combination of display data a and b, and it accomplishes intermediate tone display.

The foregoing technique as described in the aforementioned publication accomplishes intermediate ton display by splitting the voltage pulse width applied to the liquid crystal in one horizontal period equally into two and combining the pulses. However, the aforementioned publication does not disclose how to produce the data a and b from the display signals and describes the data a and b as corresponding to only one picture element of the liquid crystal panel. Generally, the liquid crystal panel is provided with many picture elements in a horizontal or raster direction. Thus, in practice it is difficult to produce the data a and b of one raster from display signals. Each display signal supplied to a liquid crystal display apparatus has a pulse width of one horizontal period.

Reference is made to FIG. 4 which shows an example of a liquid crystal panel of a liquid crystal display apparatus having four dots (picture elements) in the horizontal direction with X lines X1, X2, X3 and X4 and two dots in the vertical direction with Y lines Y1 and Y2, and which may be utilized for intermediate tone display in accordance with color display signals R, G and B as shown in FIG. 5 wherein a pulse width is split for one horizontal period. As shown in FIG. 4, the color display signals R, G and B will be displayed by an OFF state, an intermediate state and an ON state. On line Y1, pulses 1, 2, 3 and 4 from the lines X1, X2, X3 and X4 are respectively supplied to the display apparatus so that the OFF state, the intermediate state, the intermediate state, and the ON state are respectively displayed by the panel. Further, on the line Y2, pulse 2 is supplied from each of the lines X1–X4 so that the intermediate state is displayed. If in this configuration, the intermediate tone display method with splitting of the pulse width is utilized, the data a for displaying the line Y1 must be (0,0,1,1) and the data b therefor must be (0,1,0,1). Also, the data a and b for displaying the line Y2 must be (0,0,0,0) and (1,1,1,1), respectively, as shown in FIG. 5. Therefore, if the intermediate tone display with splitting of the pulse width is applied to a liquid crystal panel of 4×2 dots, it is necessary to produce the data a and b as shown in FIG. 5 from the original display signals, but since the aforementioned publication only discloses a one dot display, such publication provides no description concerning the necessary operations. Additionally, when the display area for intermediate tone display with the same combination is expanded in the X direction, a rising edge or falling edge of pulses which make a simultaneous transition in one horizontal period create a noise, resulting in a degraded brightness of display. Also, when the display area for intermediate tone display with the same combination is expanded in the Y direction, the liquid crystal application pulse has its frequency component raised, resulting in a degraded brightness of display and increased crosstalk. Moreover, liquid crystal display based on the conventional technique merely accomplishes three-tone display that is an active dot, intermediate dot and inactive dot, and it is limited in ability in a sense of a multi-level tone display.

SUMMARY OF THE INVENTION

It is an object of the present invention to provide a method and apparatus enabling multiple level tone display for a liquid crystal apparatus which overcomes the problem of the prior art.

It is a further object to provide a method and apparatus for a liquid crystal display apparatus enabling multiple level tone display utilizing splitting of a voltage pulse width applied to a liquid crystal in one horizontal period into equal intervals of at least two, with the intention of preventing the degradation of brightness of display even with an expanded display area for intermediate tone display in the X and Y directions, or providing the ability of multiple level tone display.

According to a feature of the present invention a phase inverting circuit is provided which inverts the phase of the liquid crystal application voltage pulse with respect to adjoining dots in the X and Y directions, thereby accomplishing intermediate tone display without incurring degradation of brightness of display. The phase inverting circuit operates according to the present invention to rearrange 2-bit data used to display one dot in the X and Y directions, and applied liquid crystal application pulses corresponding to the rearranged 2-bit display data to a liquid crystal panel by way of the X drive circuit. Through the rearrangement of data, liquid crystal application pulses for adjacent dots have their rising edge and falling edge timed coincidently, so that noise created at rising and those at falling cancel each other, thereby preventing degradation of brightness of display caused by the expansion of the intermediate tone display area.

In accordance with another feature of the present invention line memories and/or frame memories are utilized. With line memories, two line memories, each introducing display data for one line, are provided.

In accordance with a feature of the present invention, multiple level tone display is accomplished by the provision of a circuit, which reduces frame-wise display data, within the data generation circuit, so that reduced data is displayed. The data generation circuit counts the number of frames on the basis of the frame clock which is a logical product of the leading line clock and line clock, decodes the count value and display data, and stores the data in a line memory.

According to the present invention, the liquid display apparatus includes a liquid crystal panel of a plurality of dots, an X drive circuit for supplying display information of at least one line to the liquid crystal panel and a Y drive circuit for selecting one-dot for each line of the liquid crystal panel, the X drive circuit and the Y drive circuit enabling energization of the liquid crystal panel. A plurality of memories are provided for receiving a plurality of bits of information data and for storing at least M dot display information data so as to enable display of a respective line of the liquid crystal panel, M being an integer. A selection arrangement is provided for selecting one bit of display information data out of a plurality of bits of display information data to be read out of the memories and a selection controller is provided for specifying the one bit of display information data to be selected by the selection arrangement so as to enable read out of each one bit of the plurality of bits in a predetermined time sequence corresponding to one horizontal period divided by N for display, where N is an integer of at least two. The X drive circuit is supplied one dot information at least two times during the one horizontal period so that one dot is controlled for display at least two times during the one horizontal period to enable multi-level tone display.

The above and other objects, features, and advantages of the present invention will become more apparent from the following description when taken in connection with the accompanying drawings which show, for the purposes of illustration only, several embodiments in accordance with the present invention.

BRIEF DESCRIPTION OF THE DRAWINGS

FIG. 2 illustrates waveforms in connection with FIG. 1.

FIG. 3 shows the relationship of display data, selected pulses and display in connection with FIG. 1.

FIGS. 7 and 8 illustrate date rearrangement in accordance with FIG. 6.

FIGS. 10-14 illustrate signal waveforms and drive data for display of pulses.

FIGS. 20-24 illustrate data rearrangement and waveforms in connection with FIG. 19.

FIGS. 26-31 are diagrams showing data rearrangement and waveforms in connection with FIG. 25.

FIGS. 35-37 are diagrams for explaining eight-level tone display based on a combination of ⅓ pulses width modulation and inter-frame reduction.

DETAILED DESCRIPTION OF THE PREFERRED EMBODIMENTS

Figure 6:
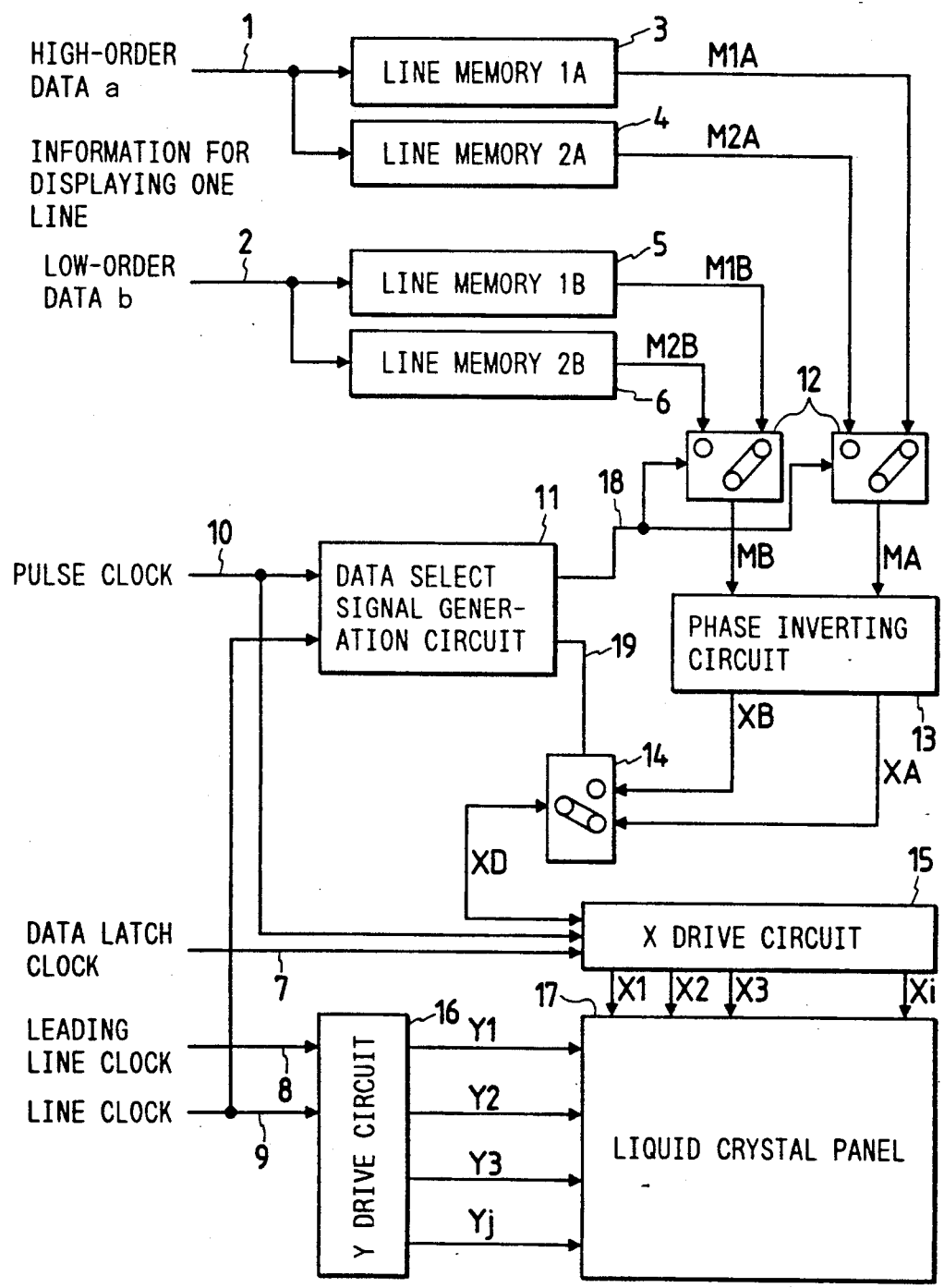
FIG. 6 is a block diagram of a liquid crystal display apparatus in accordance with an embodiment of the present invention utilizing a phase inverting circuit.

FIG. 6 is a block diagram of an embodiment of the present invention, in which reference numerals 1 and 2 represent information for displaying one line in the form of high-order data A and low-order data B of color information for displaying one dot. Line memories 3 and 4 are provided for storing the A data, line memories 5 and 6 are provided for storing the B data for one line. Data is written into the line memories once during one horizontal period and is readout therefrom twice during one horizontal period. A data select signal generation circuit 11 produces data select signals 18 and 19 from the pulse clock 10 and line clock 9. The data select signal 18 alternates between high and low each horizontal period in accordance with the line clock 9, and the data select signal 19 alternates between high and low each half of the horizontal period in accordance with the pulse clock 10 having a frequency twice that of the line clock 9. Data select circuits 12 and 14 have the signals 18 and 19 applied thereto and phase inverting circuit 13 which rearranges two kinds of data for display receives signals from the data select circuits 12. There are also provided X and Y drive circuits 115 and 116 and a liquid crystal panel 17.

In FIG. 6, a data for one line is introduced to the line memory 3(1A) or line memory 4(2A) alternately for every line once during one horizontal period, and the data is read out from line memories opposite to those at introduction alternately for every line twice during one horizontal period. The read-out data M1A or M2A is selected as MA by the select circuit 12 in response to the data select signal 18 which alternates for each line. The operation for B data, line memory 5 (1B) and line memory 6(2B) is identical, with data MB being selected by the associated data select circuit 12.

In the phase inverting circuit 13, the data MA and MB sent from the data select circuits 12 are rearranged in a dot-wise manner in the X direction and in the line-wise manner in the Y direction, and delivered as X drive data XA and XB for the X drive circuit 15. The data rearrangement operation of the phase inverting circuit 13 is described with reference to FIGS. 7 and 8.

FIG. 7 shows the data rearrangement position of the phase inverting circuit 13 wherein a dot indicated by "-" is not accompanied by the rearrangement of input data MA and MB to the phase inverting circuit and the input data are delivered immediately as the X drive data XA and XB. A dot indicated by "0" is accompanied by the rearrangement of input data MA and MB to the phase inverting circuit 13, and the rearranged data are delivered as the X drive data XA and XB. Specifically, as shown in FIG. 8 for a dot indicated by "-" in FIG. 7, input data (MA, MB)=(0, 0) is reformed to output data (XA, XB)=(0, 0), input data (MX, MB)=(0, 1) is reformed to output data (XA, XB)=(0, 1), input data (MX, MB)=(1, 0) is reformed to output data (XA, XB)=(1, 0), and input data (MX, MB)=(1, 1) is reformed to output data (XA, XB)=(1, 1). For a dot indicated by "0" in FIG. 7, input data (MA, MB)=(0, 0) is reformed to output data (XA, XB)=(0, 0), input data (MX, MB)=(0, 1) is reformed to output data (XA, XB)=(1, 0), input data (MX, MB)=(1, 0) is reformed to output data (XA, XB)=(0, 1), and input data (MX, MB)=(1, 1) is reformed to output data (XA, XB)=(1, 1). As a result, the phase inverting circuit 13 implements the data rearrangement on input data (MX, MB)=(0, 1) or (1, 0) for a display dot marked by "0" to produce data XA and XB. FIG. 2 shows output data (XA, XB) for each dot having input data of (MX, MB)=(0, 1). Among output data XA and XB provided by the phase inverting circuit 13, one of XA and XB is selected by the data selector 14 in accordance with the data select signal 19 which splits one line equally into two parts, and the selected one is delivered as XD.

The X drive circuit 15 introduces display information for one line with high-order data XD(=XA) in response to the data latch clock 7, and produces display information X1-Xi indicated by XD=(XA) at the falling edge of the successive pulse clock. While the X drive circuit 15 is delivering display information of high order data XD (=XA), low-order data for one line is introduced in response to the data latch clock 7, and display information X1-Xi specified by XD (=XB) is delivered at the falling edge of the successive pulse clock. The display information X1-Xi produced by the X drive circuit 15 is applied to the liquid crystal panel on one line, which is the line in a high state according to the output Y1-Yj of the Y drive circuit 16 so that light in proportion to the information is transmitted. The Y drive circuit 16 introduces the leading line clock 8 in response to the line clock 9, making the Y1 high, and it shifts the high state to Y2 ... Yj in response to the following line clocks 9.

Figure 9:
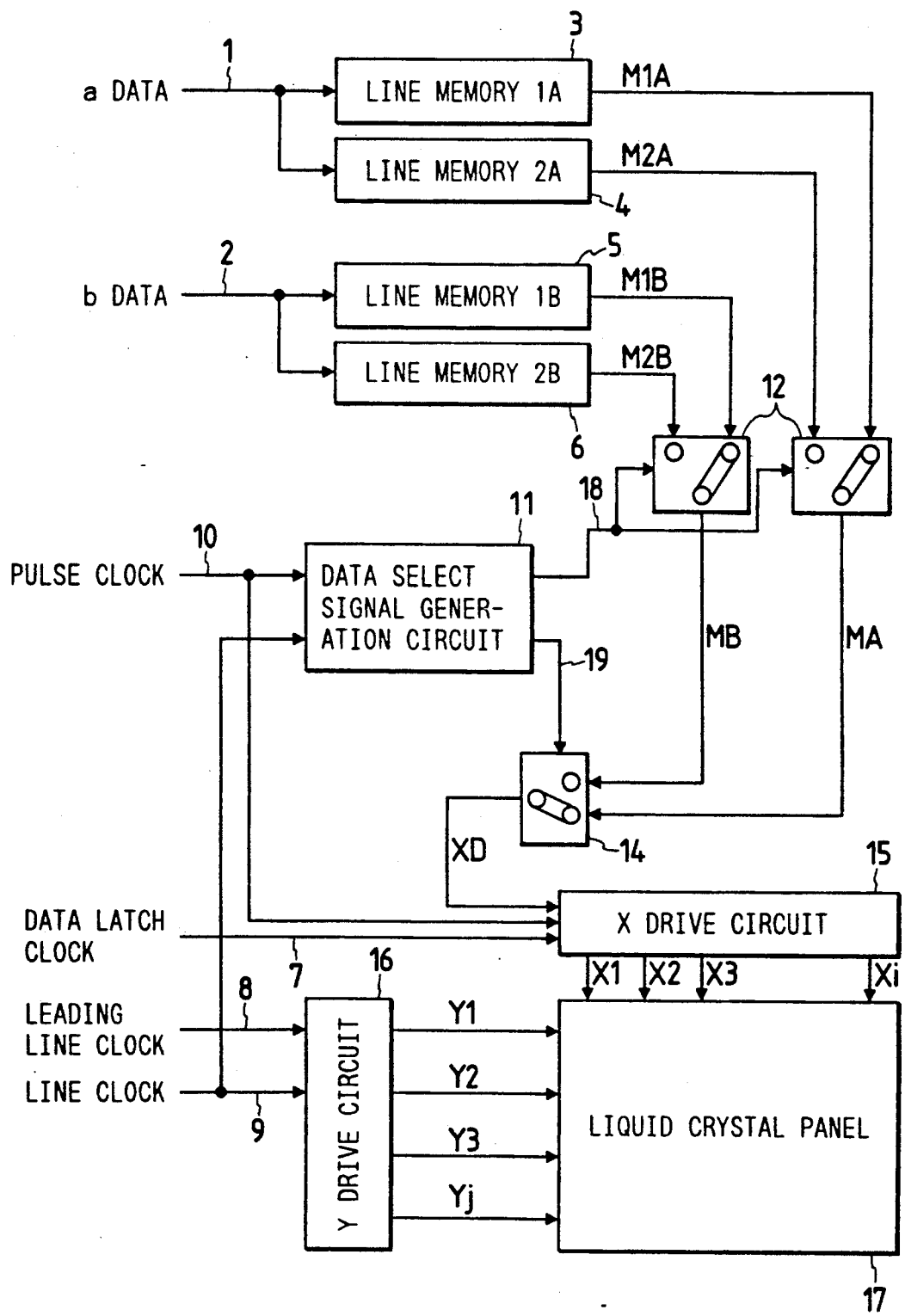
FIG. 9 is a block diagram of a liquid crystal display apparatus in accordance with another embodiment of the present invention without a phase inverting circuit.

The method of intermediate tone display which creates an intermediate brightness between an active dot in accordance with the present invention and inactive dot will be described with reference to FIGS. 9 to 12. In FIG. 9, display data A and B for one line are simultaneously introduced to the line memory 3(1A) and line memory 5(1B) during one horizontal period, X drive data MA and MB are read out of the line memories 3(1A) and 5(1B) twice during one horizontal period, MA or MB is selected by the data selector 14 each half of the horizontal period and the selected one is sent as XD to the X drive circuit 15, whereby display information X1-Xi is delivered in accordance with the X drive data XD. The data selector 14 selects data so that the X drive data XD becomes XA during the first half of the horizontal period and XB during the second half of the horizontal period.

Figure 1:
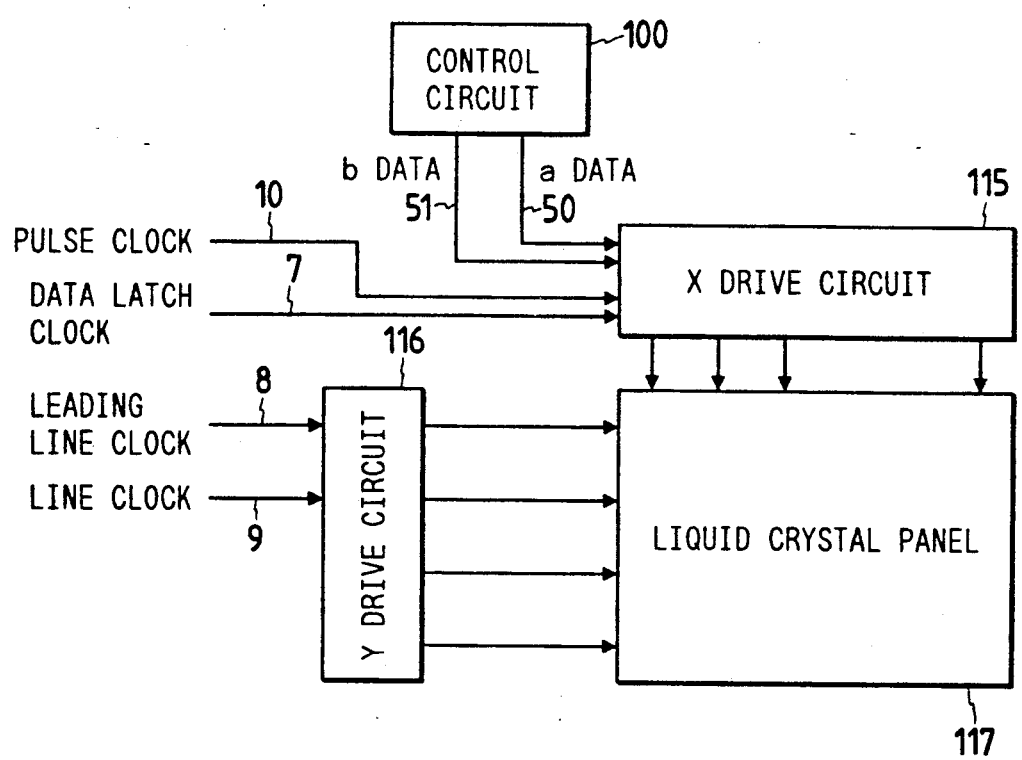
FIG. 1 is a block diagram of a conventional liquid crystal display apparatus.
Figure 4:
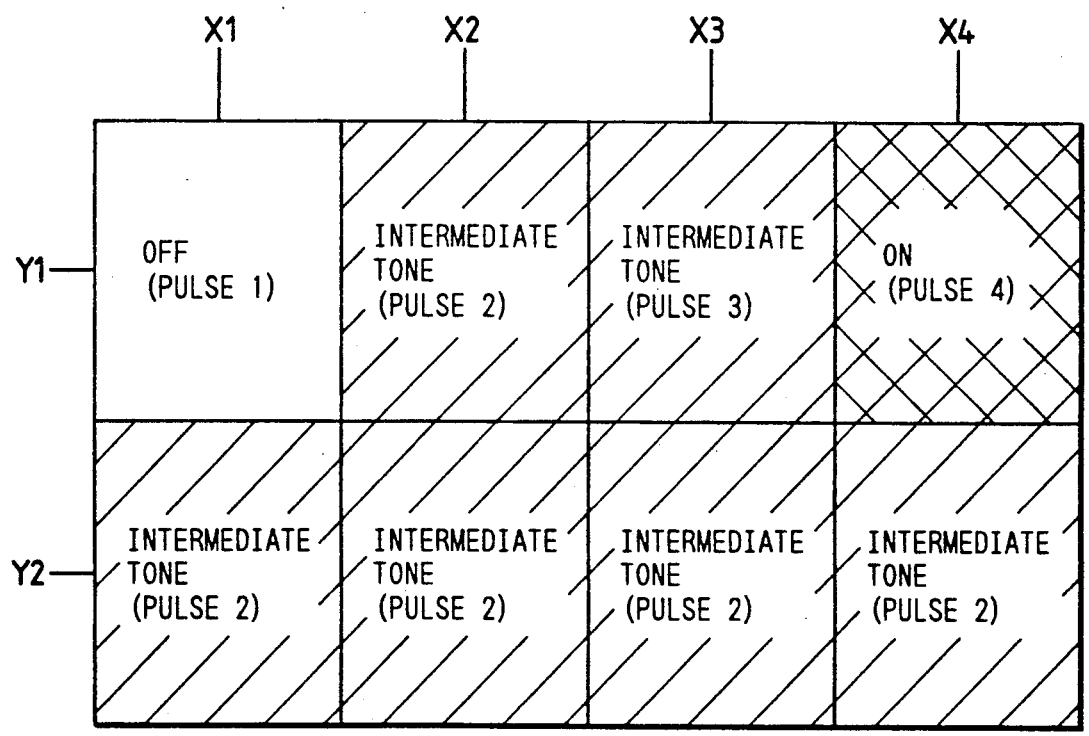
FIG. 4 illustrates the operation of a display panel for intermediate tone display.
Figure 5:
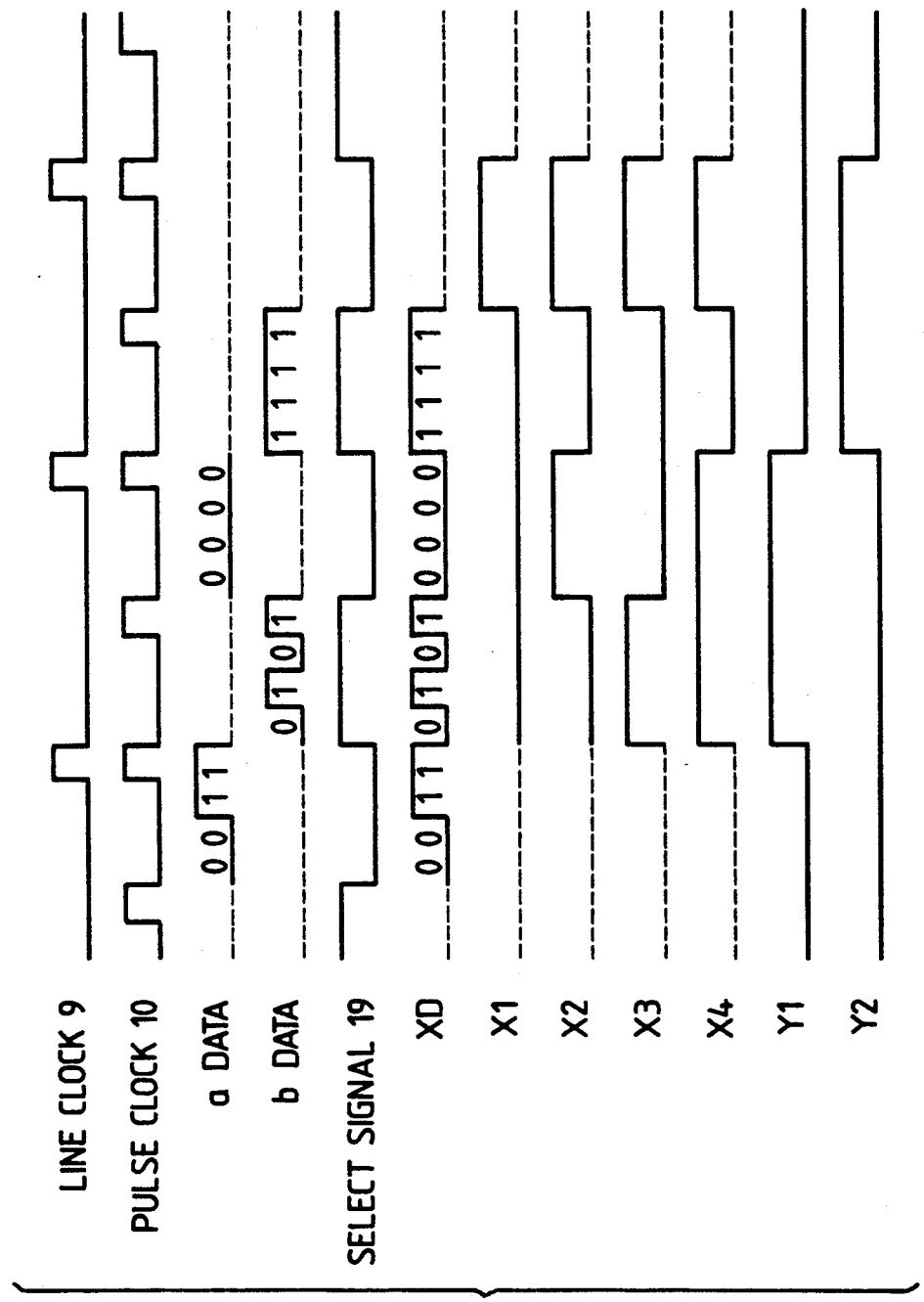
FIG. 5 illustrates signal waveforms for intermediate tone display.
Figure 12:
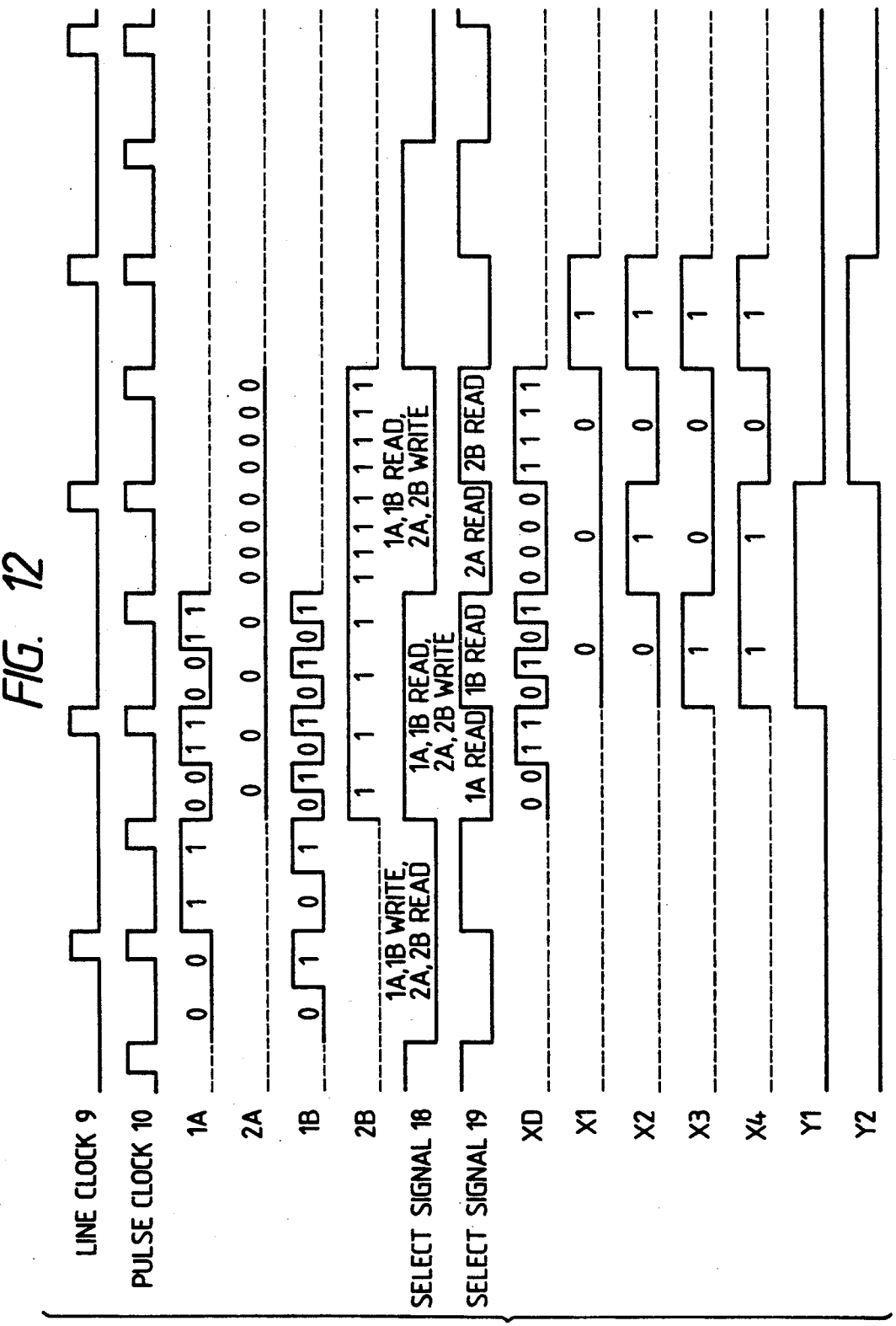

FIGS. 10 and 11 show the relation between the X drive data and display information. While the line memories 3(1A) and 5(1B) are being read out twice during one horizontal period, display data A and B for the next one line are introduced to the line memories 4(2A) and 6(2B) during one horizontal period. After the line memories 3(1A) and 5(1B) have been read twice during one horizontal period, the line memories 4(2A) and 6(2B) are read out twice during the next one horizontal period, and during this one horizontal period of reading, display data for the next one line is introduced to the line memories 3(1A) and 5(1B) The same operation is repeated. Read-out data for one line is switched by the data selector 12. In the circuit arrangement of the present invention shown in FIG. 9, a display as illustrated in FIG. 4 is obtained in the following manner with reference to the signals and time chart of FIG. 12. In correspondence with the explanation of FIG. 5, original color display signals R, G and B are displayed for an OFF state, intermediate state and ON state. Referring to FIG. 12, first data A and B for displaying the line Y1 are stored in the line memories 3(1A) and 5(1B) during one horizontal period. The data A and B correspond to the original color display signals R, G and B which are simultaneously provided to the display apparatus. Then, the data A and B are read from the line memories 3(1A) and 5(1B) twice during one horizontal period, respectively. At the same time, the data A and B for displaying the line Y2 are stored in the line memories 4(2A) and 6(2B) during on horizontal period. The read out data MIA and MIB from the line memories 3(1A) and 5(1B) are selected in accordance with the data select signal 18 applied to the data selectors 12.

Figure 13:
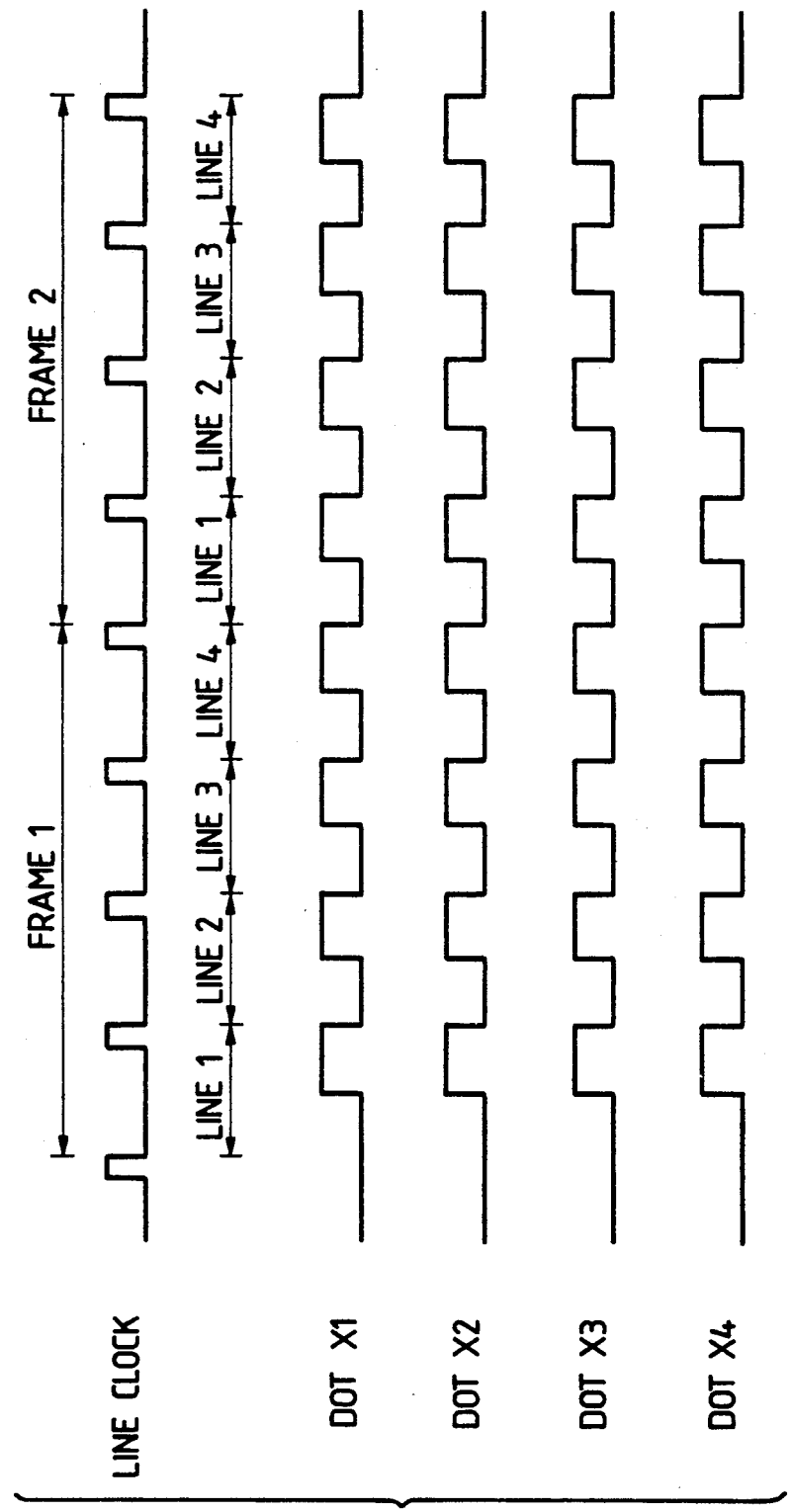

Next, in the circuit arrangement of FIG. 9, upon receiving display data with (A, B)=(0, 1) for i rows and j columns (i and j are assumed to be 4), the X drive circuit 15 produces display pulses shown in FIG. 13. In the figure, display pulses for dot X1 to dot X4 rise and fall at the same timing. This results in increased noise caused by the rising display pulse and falling display pulse for displaying one dot, and consequently the brightness of display on the liquid crystal panel 17 is deteriorated. Moreover, each X dot is accompanied by a rising portion and a falling portion in one line, causing the frequency component to rise due to the variation of pulse, and this results in the occurrence of crosstalk on the liquid crystal panel.

Figure 14:
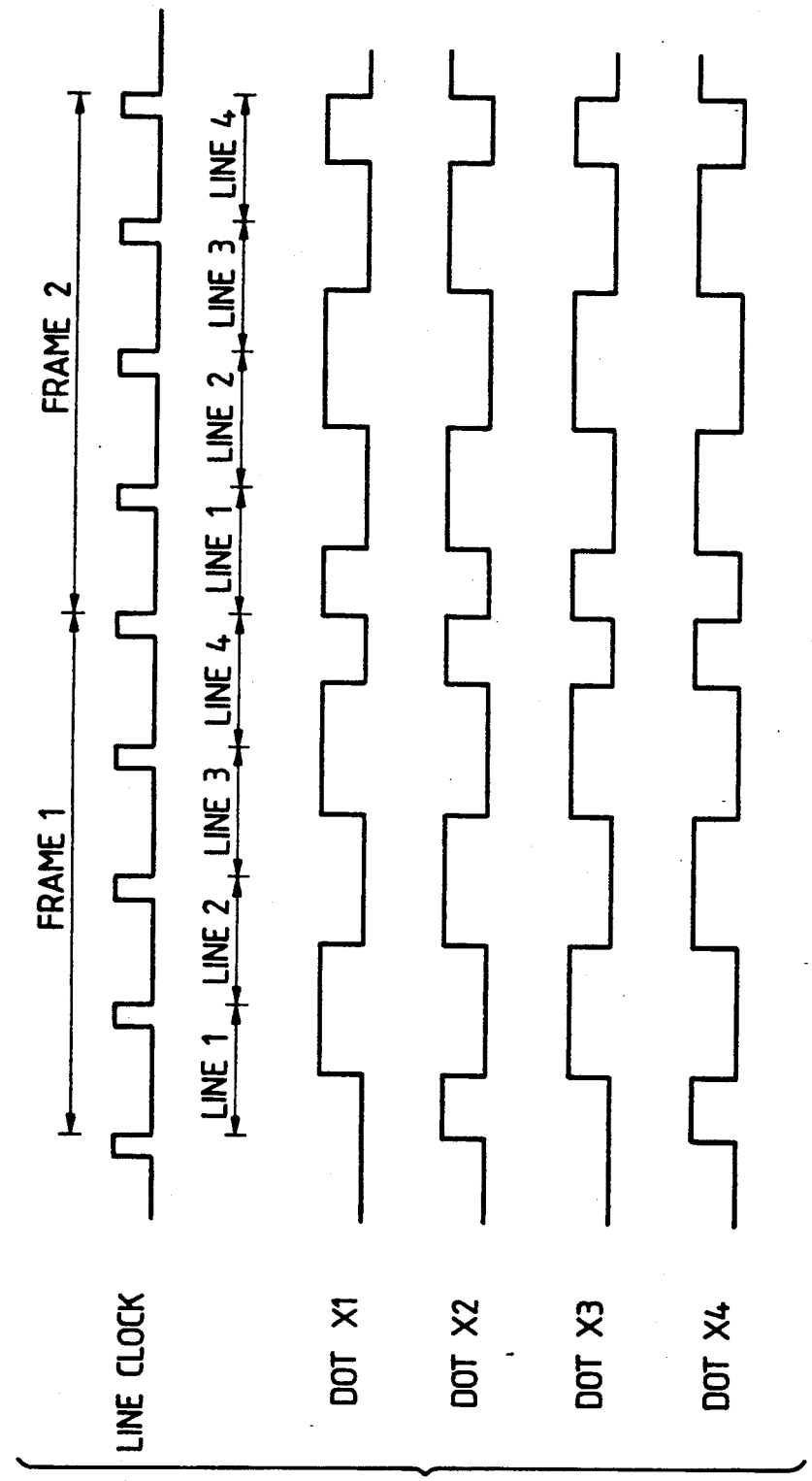

With the intention of alleviating the degradation of display brightness on the liquid crystal panel 17 and decreasing the occurrence of crosstalk, the circuit arrangement shown in FIG. 6 includes the phase inverting circuit 13 which operates to rearrange MA and MB selected by the data selector 12 in a frame-wise manner, line-wise manner and dot-wise manner as shown in FIG. 8. In the liquid crystal display circuit with the provision of the phase inverting circuit 13 shown in FIG. 6, the X drive circuit 15 produces display pulses shown in FIG. 14 upon receiving display data with (A, B)=(0, 1) for i rows and j columns (i and j are assumed to be 4). FIG. 11 shows that when output pulses for adjoining X dots are different and when the pulse for one dot rises, pulses for adjacent dots fall coincidently. In FIG. 13 which shows display pulses of the liquid crystal display circuit arrangement of the present invention without the provision of the phase inverting circuit 13, display pulses for dot X1 to X4 rise and fall at the same timing, deteriorating the display brightness due to a rising noise and failing noise, whereas the provision of the phase inverting circuit 13 provides different display pulses for adjoining dots and the same timing for rising and falling, as shown in FIG. 14. By changing the transition of display pulses for adjoining dots from rising to falling, the noise thereof cancel each other, and the degradation of brightness of liquid crystal display can be eliminated or reduced. Furthermore, in the liquid crystal display circuit without the phase inverting circuit 13, the display pulse once rises and falls in one line for each X dots, as shown in FIG. 13, and therefore the frequency component is higher due to the variation of pulse rises, resulting in the occurrence of crosstalk on the liquid crystal panel 17, whereas the provision of the phase inverting circuit 13 unifies display pulses of one line of one X dot and display pulses of the next line or previous line thereby to eliminate the rising or falling of display pulse on one line, and it reduces by half the variation of display pulse in one frame period. This results in the reduction of frequency component by half, and consequently the crosstalk occurring on the liquid crystal panel 17 is reduced.

The selection pulse 2 and pulse 3 shown in FIG. 10 have the same pulse width and therefore both pulses should provide the same brightness of display, however, complete noise cancellation is not achieved unless rising noises and falling noises in one line are in a 1-to-1 correspondence, and therefore there arises a small difference in the brightness of display between pulse 2 and pulse 3. On this account, when adjoining two dots on the liquid crystal display panel 17 are activated with pulse 2 and pulse 3, these dots will have slightly different brightnesses of display. In order to overcome this problem, the phase inverting circuit 13 is operated to re-arrange the X drive pulse for every frame so that the display pulse for one dot is varied for every frame from pulse 2 to pulse 3 to pulse 2 and to pulse 3, and the display pulse for the adjacent dot is varied for every frame from pulse 3 to pulse 2 to pulse 3 and to pulse 2, thereby equalizing the brightness of display for these dots.

Figure 38:
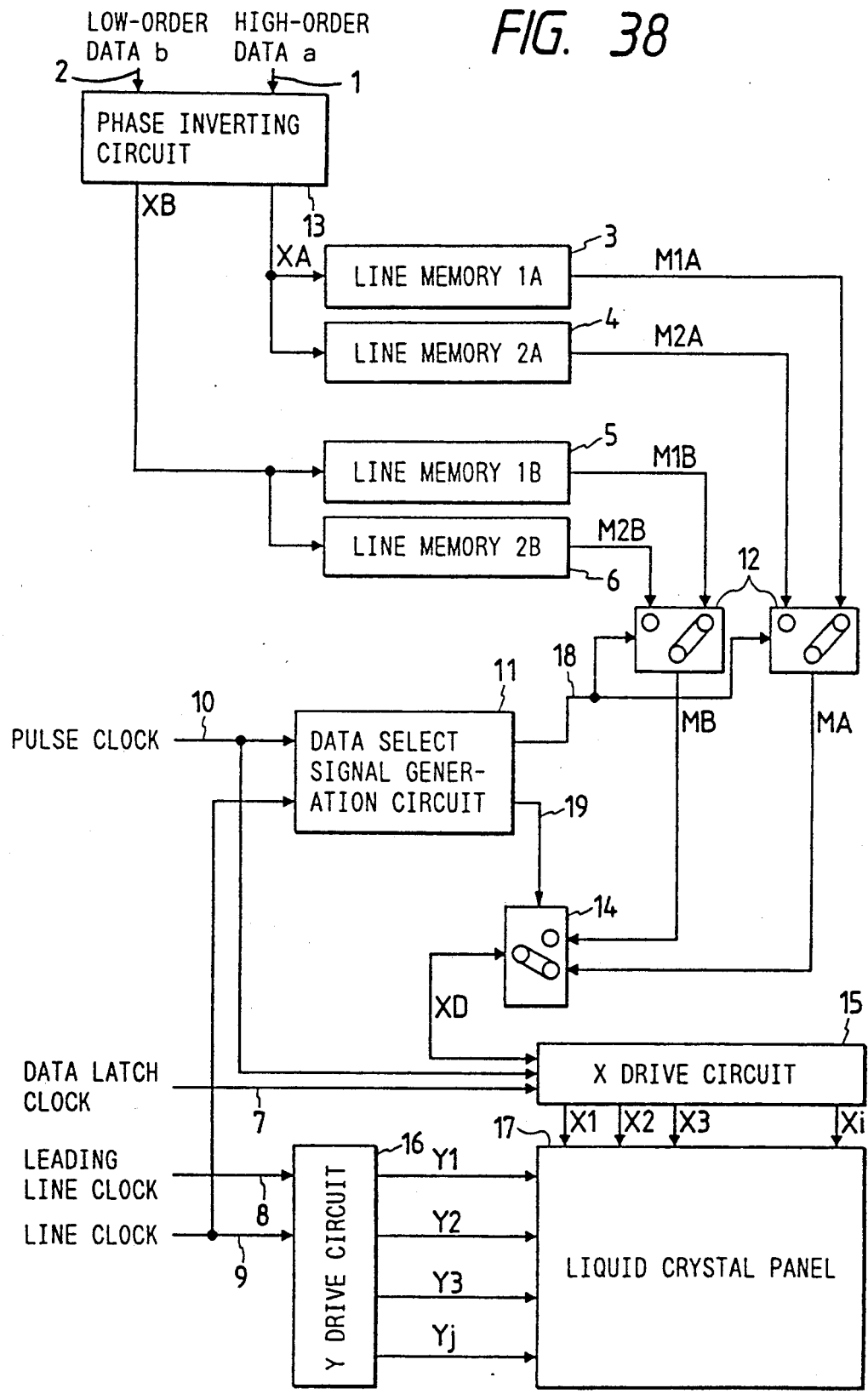
FIG. 38 is a block diagram of another embodiment of the liquid crystal display apparatus.

Furthermore, although the foregoing phase inverting circuit 13 rearranges the display information MA and MB read out of the line memory, in accordance with the present invention, the phase inverting circuit 13 may alternatively be provided at the front of the line memory so that data A and data B are rearranged before being introduced to the line memories as illustrated in FIG. 38.

Although the foregoing liquid crystal display circuit represents an example of the ½ pulse width modulation in which one horizontal period is split equally into two parts, the same effect will result for the 1/n pulse width modulation in which one horizontal period is split into n parts. The following describes the ⅓ pulse width modulation, i.e., the case of n=3, with reference to FIGS. 15 to 28.

Figure 15:
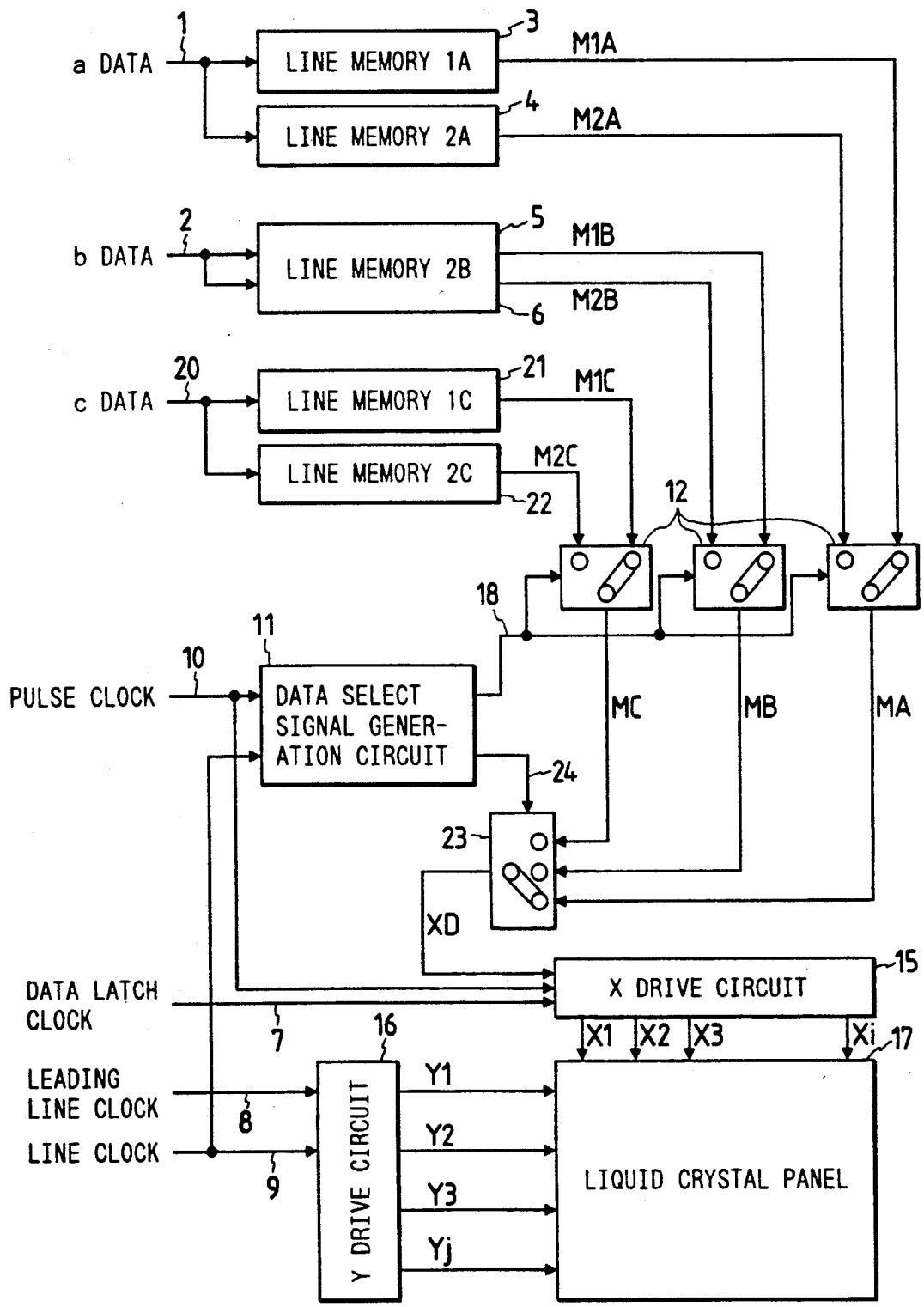
FIG. 15 is a block diagram of a liquid crystal display apparatus in accordance with another embodiment of the present invention without a phase inverting circuit.

FIG. 15 is a modified version of the liquid crystal drive circuit shown in FIG. 9 with the intention of ⅓ pulse width modulation. The circuit of FIG. 15 receives three kinds of display data including data 1(A), data 2(B) and data 20(C), and it has additional line memories 21(1C) and 22(2C) for the data 20(C) and an additional data selector 12 are provided. Also, a data selector 23 selects one kind of data from among the X drive data MA, MA and MC read out of the line memories in response to the data select signal 24 which is produced by the data select signal generation circuit 11 from the pulse clock 10 which equally splits the line clock 9 into three parts, and sends it as XD to the X drive circuit 15. One pulse out of pulse 1 through pulse 8 (FIG. 16) is applied to the liquid crystal panel 17. The remaining circuit operation is identical to the circuit of FIG. 9 which is based on the ½ pulse width. With display data of (A, B, C)=(0, 0, 1) for displaying i rows and j columns being entered (i and j are assumed to be 4), the X drive circuit 15 produces display pulses shown in FIG. 17. Similar to the case of the circuit based on the ½ pulse width, display pulses for each of the X dots rise and fall at the same timing, creating noise at the rising and falling edges that deteriorates the display brightness of the liquid crystal panel 17. Because of a rising and a falling in one line, the frequency component becomes higher due to the variation of pulse, which deteriorates the display brightness of the liquid crystal panel 17 and also crosstalk occurs. With display data of (A, B, C)=(0, 1, 1) for i rows and j columns being entered (i and j are assumed to be 4), the X drive circuit produces display pulses shown in FIG. 18 to the liquid crystal panel 17. For the same reason as in the case of (A, B, C)=(0, 0, 1), the display brightness of the liquid crystal panel 17 is deteriorated and crosstalk occurs.

Figure 19:
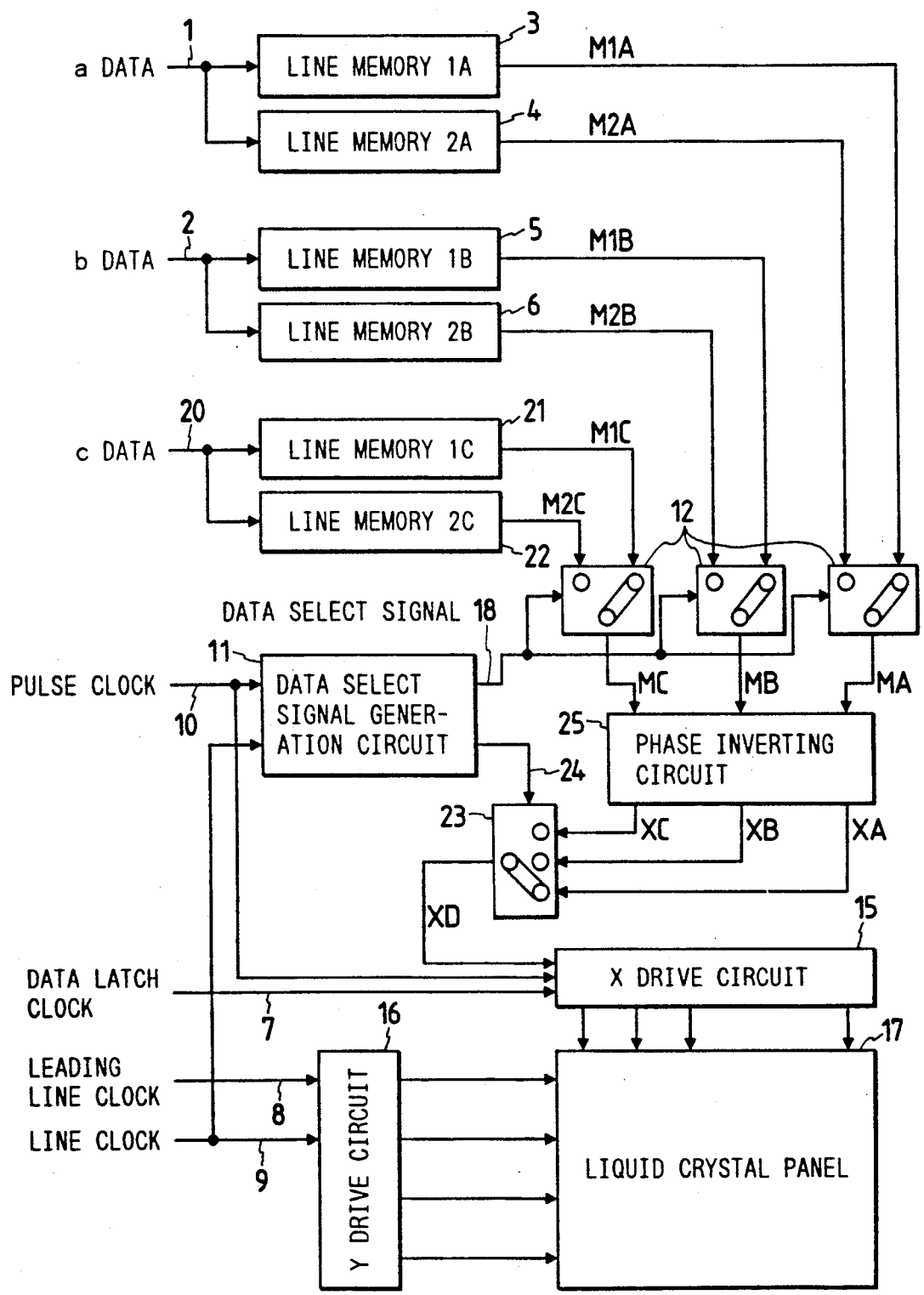
FIG. 19 is a block diagram of a further embodiment of the present invention utilizing a phase inverting circuit.

To overcome the above-mentioned problems, a phase inverting circuit 25 is provided to re-arrange data read out of the line memory for every frame, every line and every X dot as shown in FIG. 19, as in the case of display based on the ½ pulse width. The phase inverting circuit 25 re-arranges the input data MA, MB and MC in units of three frames, three lines and three dots, and delivers the results to the X drive circuit 15 as X0 corresponding to one of XA, XB and XC. The mark "-" in FIG. 20 indicates that the input data MA, MB and MC for that dot are not rearranged, but delivered immediately as XA, XB and XC to the X drive circuit 15, the mark "Δ" indicates that the input data MA, MB and MC for that dot are rearranged so that MB is delivered for XA, MC is delivered for XB, and MA is delivered for XC, and the mark "0" indicates that the input data MA, MB and MC for that dot are rearranged and MC is delivered for XA, MA is delivered for XB, and MB is delivered for XC. With display data of (A, B, C)=(0, 0, 1) for i rows and j columns being entered (i and j are assumed to be 3), data of (MA, MB, MC)=(0, 0, 1) is entered to the phase inverting circuit 25 by way of the frame memory. The phase inverting circuit 25 re-arranges the data as shown in FIG. 20, and the X drive data (XA, XB, XC) shown in FIG. 21 is delivered to the data selector 23.

Figure 16:
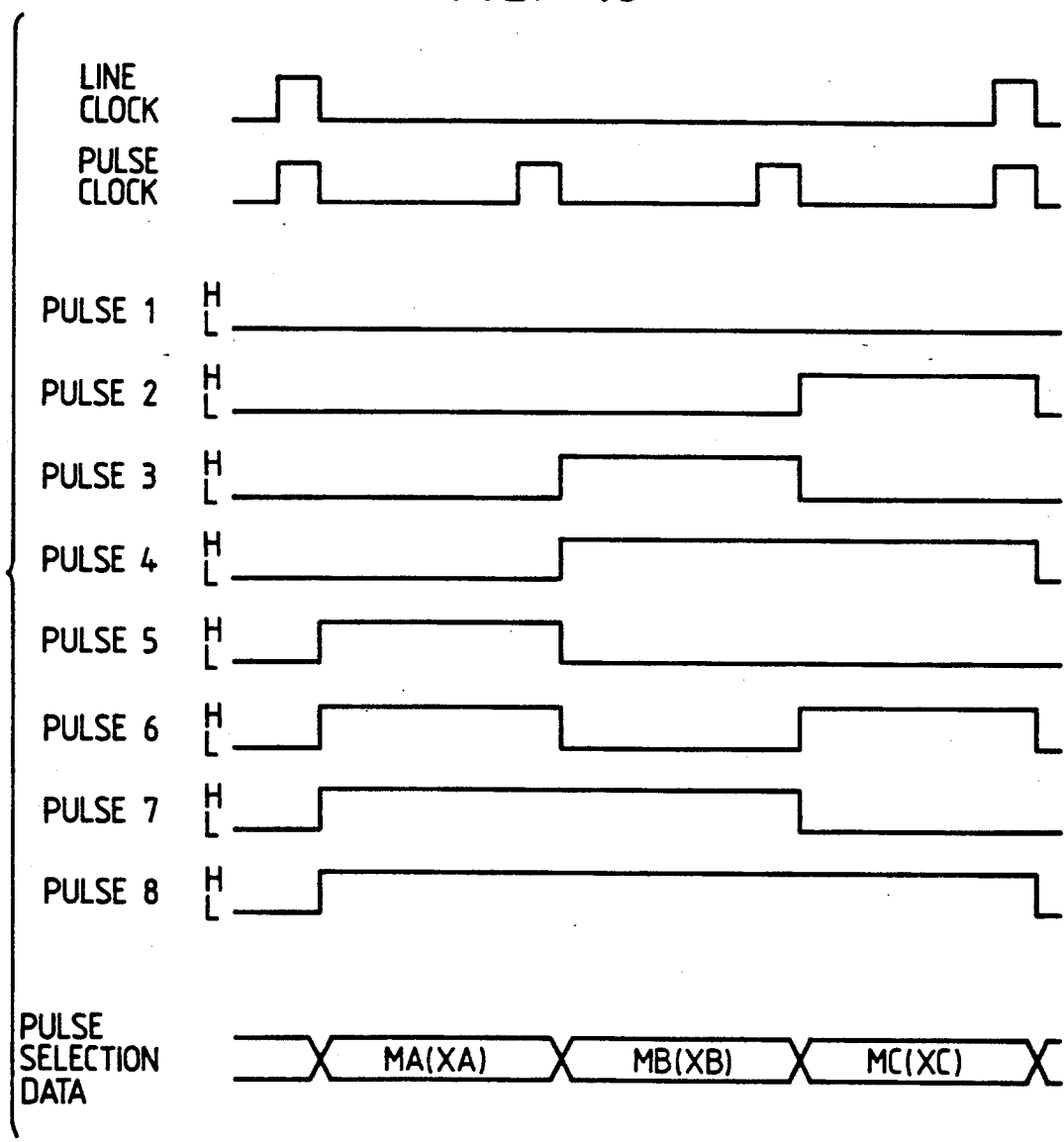
FIGS. 16-18 illustrate signal waveforms in accordance with FIG. 15.
Figure 17:
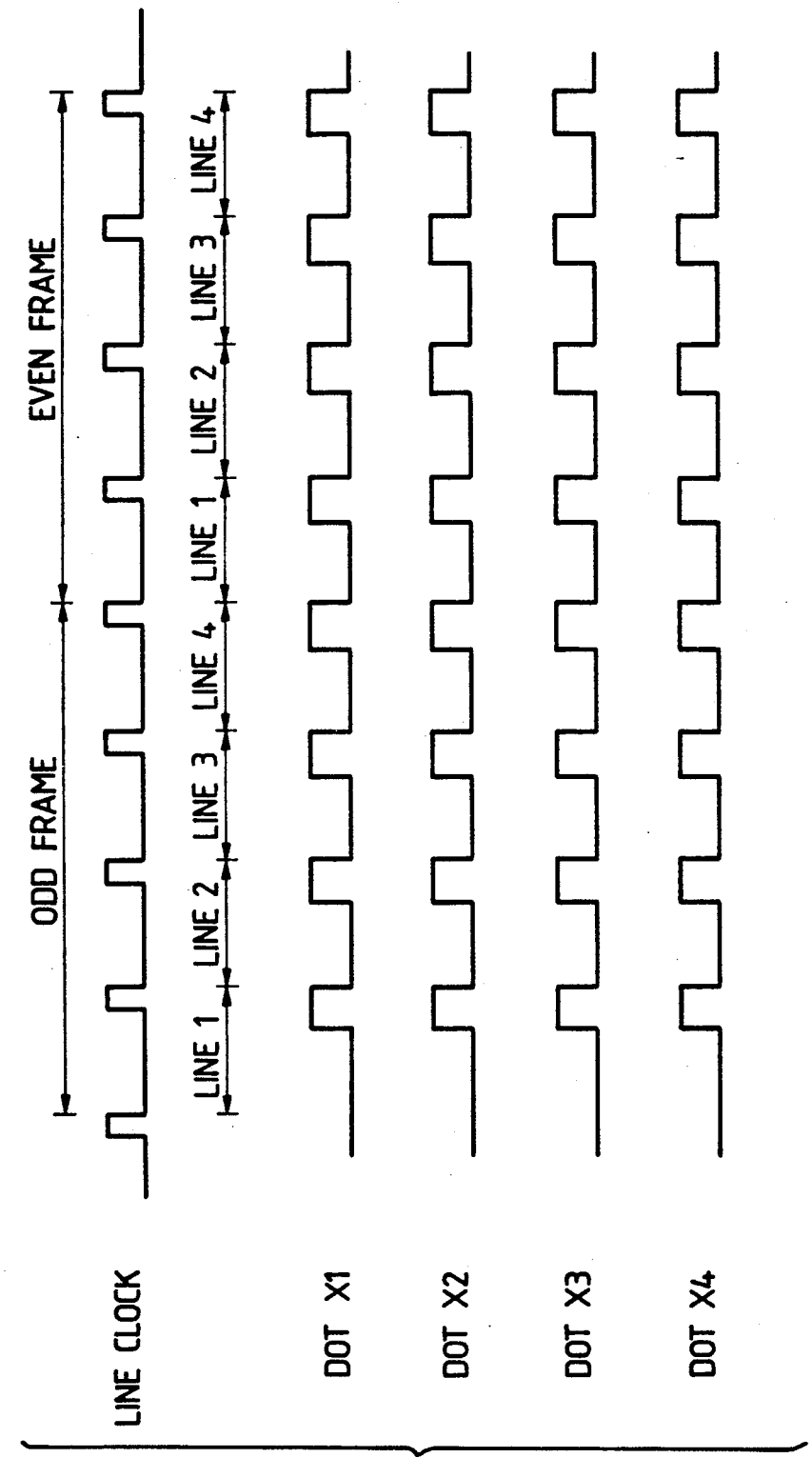
Figure 18:
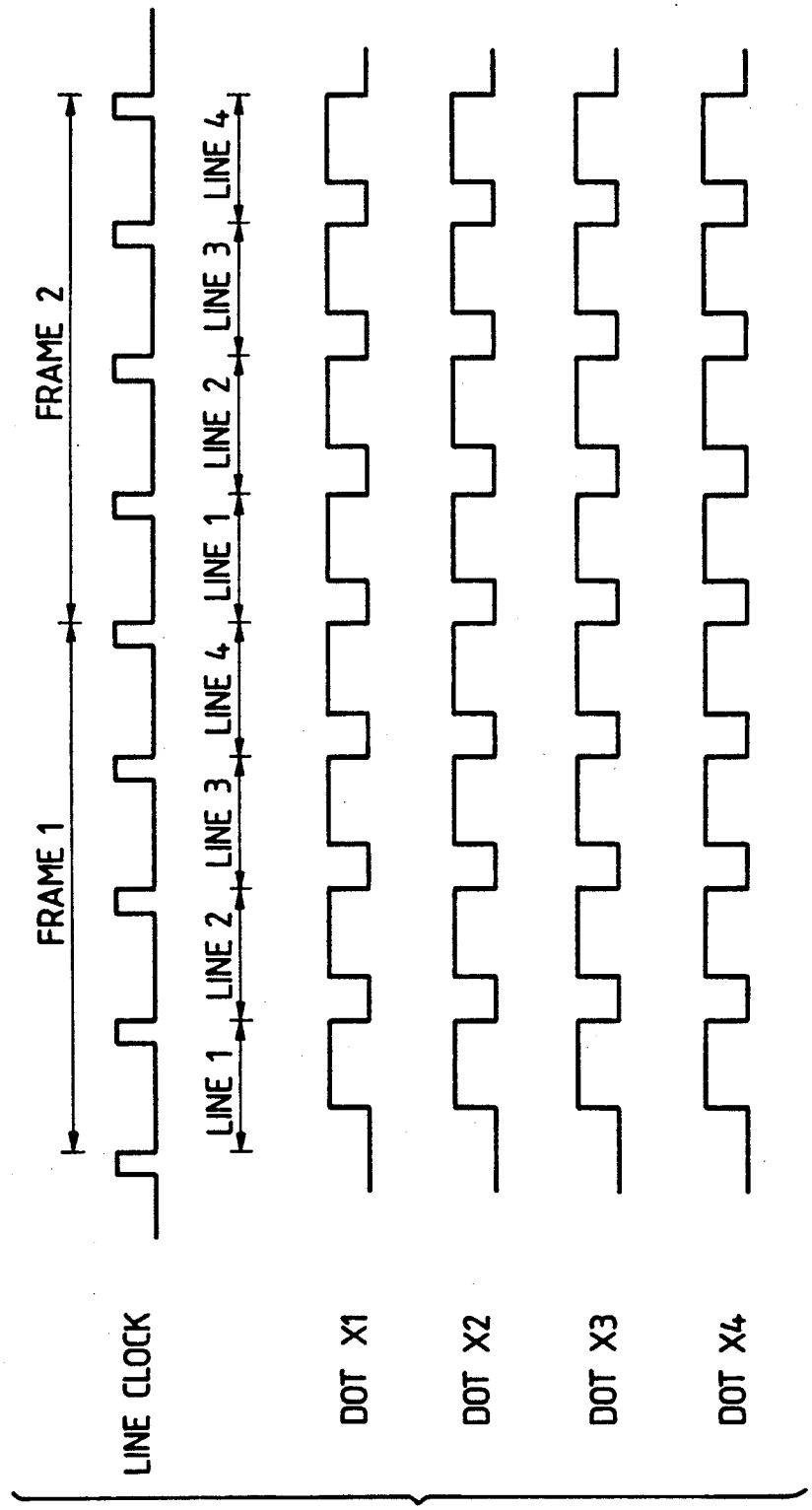
Figure 23:
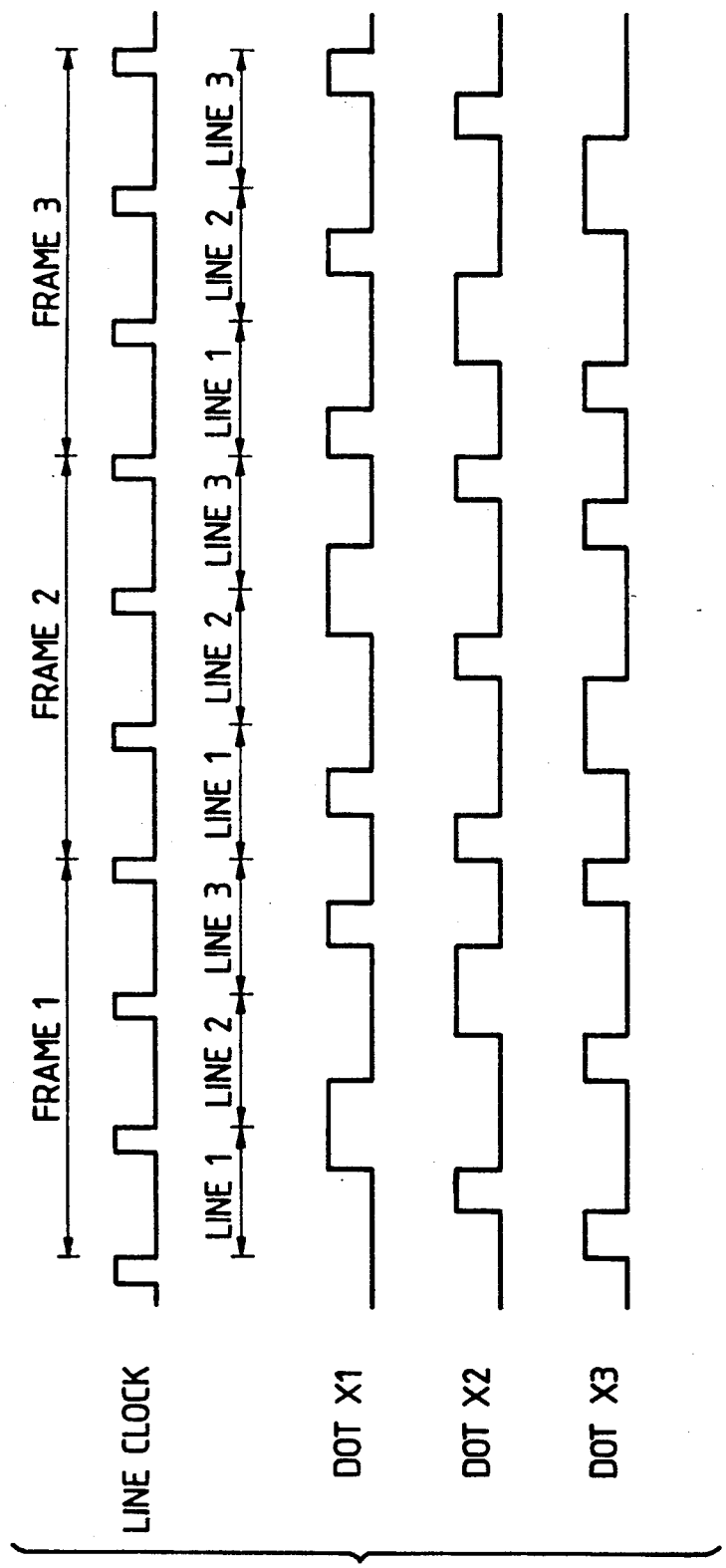

The X drive circuit 15 applies a pulse out of pulse 1 through pulse 8 shown in FIG. 16 to the liquid crystal panel 17 by being specified by data XD selected by the data selector 23. The applied pulse is shown in FIG. 23. In FIG. 23, as opposed to FIG. 17, there is a difference in applied pulses of adjacent dots in that when the pulse for one dot rises, the pulse for the adjacent dot falls. Similar to the case of the ½ pulse width, adjoining dots have a rising and falling transitions so that the noise thereof cancel each other, thereby alleviating the deterioration of brightness of the liquid crystal display. The display pulse is controlled for every line by means of the phase inverting circuit 25, thereby reducing the number of rising and failing edges of the display pulse in one line and to reducing the variation of display pulse, so that the frequency component of the display pulse is lowered and the crosstalk occurring in liquid crystal display is reduced. By controlling the display pulse for every frame by the phase inverting circuit 25, the brightness of display of adjoining dots is stabilized as in the case of the ½ pulse width. The case of entry of display data of (A, B, C)=(0, 0, 1) for i rows and j columns, and the case of entering display data of (A, B, C)=(0, 1, 1) is identical.

Figure 24:
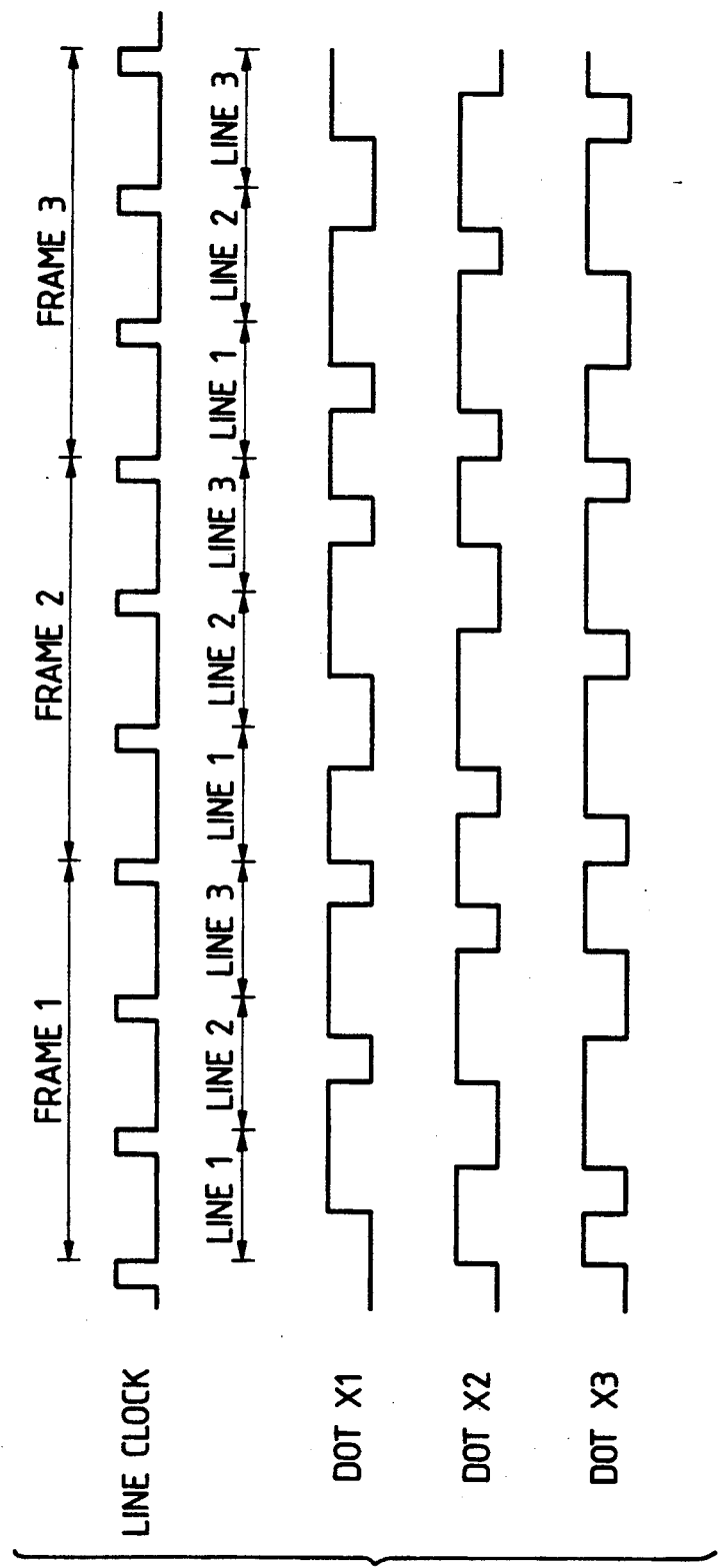

FIG. 22 shows the result of data rearrangement for (MA, MB, MC) by the phase inverting circuit 25 for producing (XA, XB, XC). FIG. 24 shows the application to the liquid crystal panel 17 of a display pulse out of pulse 1 through pulse 8 shown in FIG. 13 in accordance with XD provided by the data selector 23, and also shows the display pulse. In contrast to FIG. 18, which shows the display pulse applied to the liquid crystal panel 17 by the liquid crystal display circuit without the phase inverting circuit 25 shown in FIG. 15, the case of FIG. 24 has the mutual cancellation effect of adjoining dots and the frequency component is lower, whereby the deterioration of display brightness of the liquid crystal panel 17 is alleviated and the occurrence of crosstalk is reduced.

Although the foregoing phase inverting circuit 25 rearranges the display information MA, MB and MC read out of the line memories, in accordance with the present invention, the phase inverting circuit 25 may be alternatively disposed at the front of the line memories so that the A data, B data and C data are rearranged before being introduced to the line memories.

The above explanation has been directed to examples of pulse width modulation in which one line period is equally split into two and three parts. As the value of n increases, the number of input display data increases in proportion and line memories of n in number are required. Moreover, the phase inverting circuit 25 will become more complex, and the display pulse applied to the liquid crystal panel 17 will have a higher frequency component, resulting in a degraded display brightness and an increased crosstalk. The following describes a circuit which, even with an increased value of n, merely requires line memories of n or less in number, simplifies the phase inverting circuit 25, alleviates the deterioration of the display brightness, and reduces the occurrence of crosstalk, and is described with reference to FIG. 25 for the case of n=3.

Figure 25:
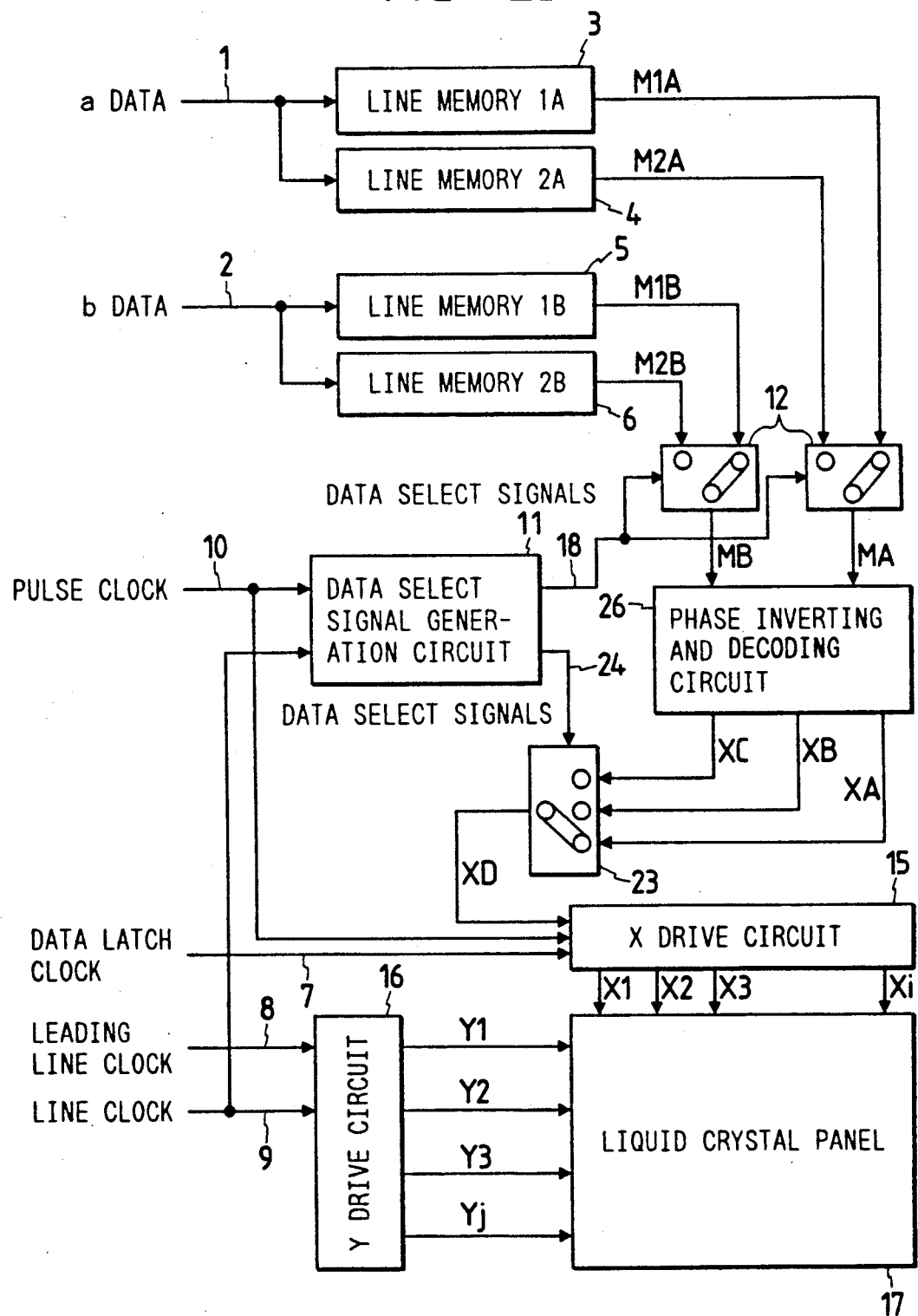
FIG. 25 is a block diagram of a still further embodiment of a liquid crystal display apparatus in accordance with the present invention utilizing a phase inverting and decoding circuit.

FIG. 25 is the case of two kinds of input display data, as opposed to three kinds of data in FIG. 19, and consequently the line memories 21(1C) and 22(2C) and the data selector 12 for data series C are eliminated. The data MA and MB read out of the line memories for data series A and B are rearranged by a phase inverting and decoding circuit 26. The third kind of data necessary for specifying display pulses in one line period is created and sent together with the rearranged two kinds of data by the circuit 26 as XA, XB and XC to the data selector 23, and drive data XD is produced. By being specified by the drive data XD, one pulse out of pulse 1 through pulse 8 as shown in FIG. 16 is delivered to the liquid crystal panel.

As shown in FIG. 26, the circuit arrangement of FIG. 25 provides a correction of two kinds and three kinds of data and, for example, enables two kinds of data A and B to become (A, B)=(0, 0) when three kinds of data A, B and C are all 0, produces (A, B)=(0, 1) when only one of A, B and C is 1, become (A, B)=(1, 0) when two of A, B and C are 1, and produces (A, B)=(1, 1) when all of A, B and C are 1, or vice versa, and the results are introduced to the A-series line memory and B-series line memory.

The phase inverting and decoding circuit 26 receives the data MA and MB read out of the line memories, and rearranges the data for every frame, every line and every X dot as shown in FIG. 27 thereby to produce XA and XC. For XB, the immediate value of MA is used. Namely, the value of MA is the A data, and A data of 1 signifies the selection of a display pulse having a pulse width equal to ⅔ or more of one line period, and by giving the value 1 of MA directly to XB and to XA or XC, it becomes possible to select a pulse equal to or greater than ⅔. Conversely, A data of 0 signifies the selection of a display pulse having a pulse width of ⅓ or less of one line period, and by giving the value 0 of MA directly to XB and to XA or XC, it becomes possible to select a pulse equal to or smaller than ⅓.

Figure 30:
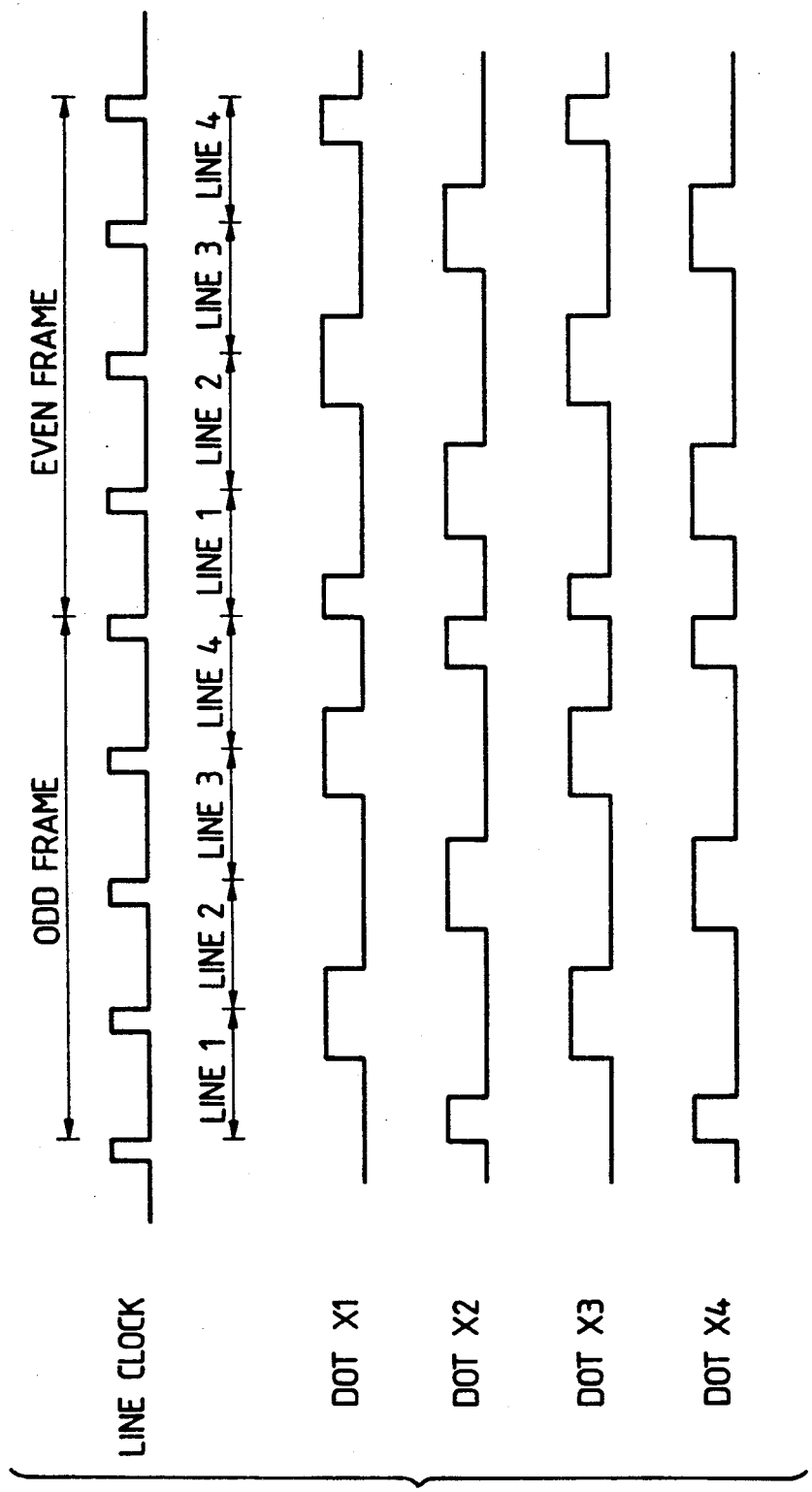

FIG. 28 shows the output of the phase inverting and decoding circuit 26 when it has received display data of (A, B)=(0, 1) for i rows and j columns (i and are assumed to be 4). Receiving the X drive data XA, XB and XC from the phase inverting and decoding circuit 26 shown in FIG. 28, the X drive circuit 15 applies display pulses to the liquid crystal panel 17 as shown in FIG. 30. The comparison of the display pulses in FIG. 27 with the display pulses of the case using three-series memories shown in FIG. 17, but without the phase inverting circuit 26, reveals that although there is no cancellation effect of rising and falling edges of display pulses of dots adjoining in the X direction, they have different timings for the rising and falling transitions of display pulses, which reduces noise at rising and falling transitions, and as a result the deterioration of display brightness on the liquid crystal panel 17 is alleviated. Moreover, by unifying display pulses of one line and those of a preceding or following line for the same X dots, the frequency component in the line direction is lowered thereby reducing the occurrence of crosstalk on the liquid crystal panel 17.

The comparison of display pulses of FIG. 30 with the display pulses of the case of using three-series memories shown in FIG. 23 and the phase inverting circuit 25 reveals that there is no cancellation effect of rising and falling edges of display pulses of dots adjoining in the X direction, as seen in FIG. 23, and therefore the display brightness resulting from the display pulses in FIG. 30 becomes slightly lower than that of the display pulses of FIG. 23. However, because of a lower frequency component in the line direction for the same X dots, the occurrence of crosstalk on the liquid crystal panel 17 is reduced. This is true also in the case of receiving display data of (A, B)=(1, 0) for i rows and j columns.

Figure 31:
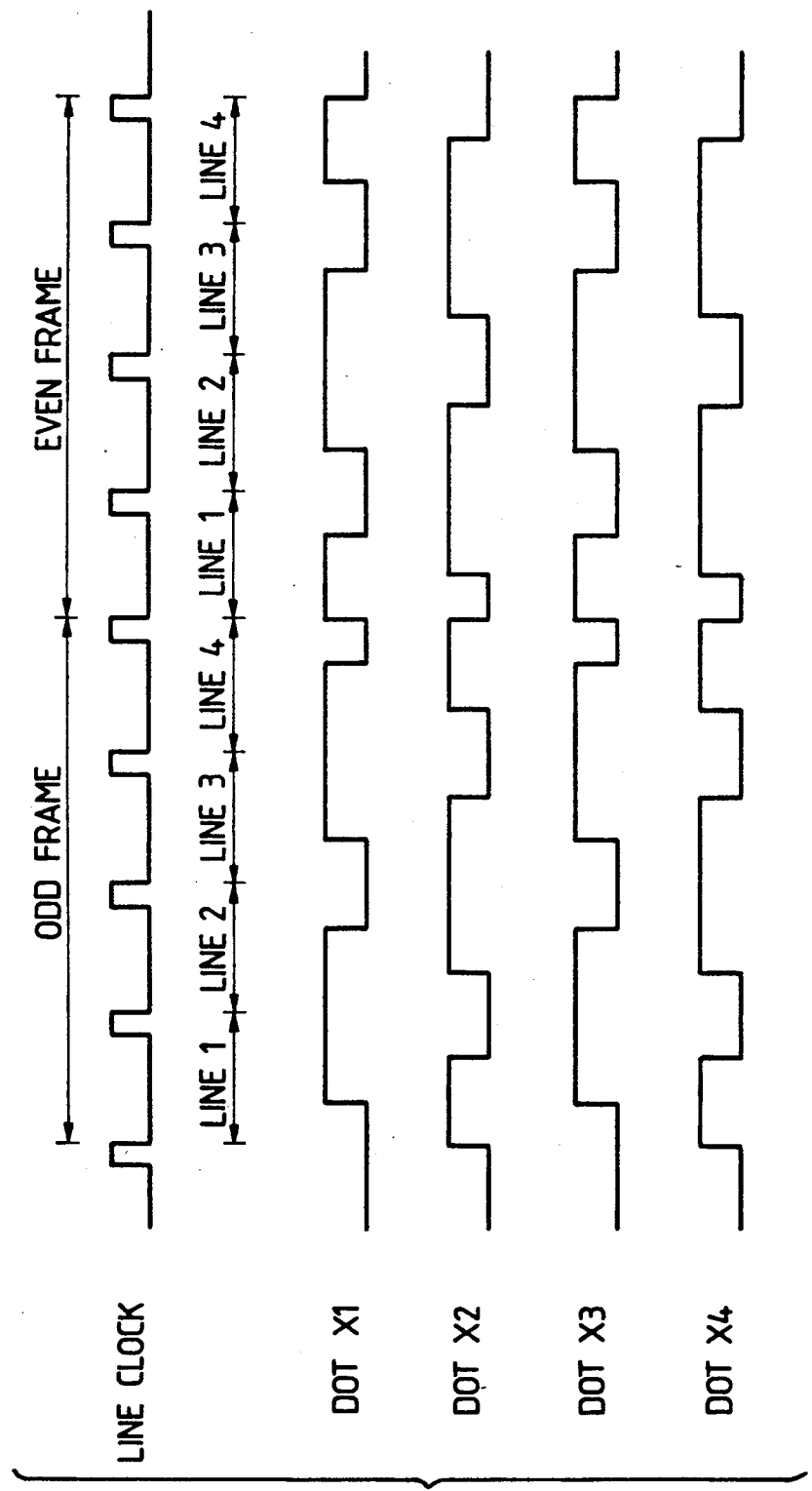

FIG. 29 shows the X drive data XA, XB and XC produced by the phase inverting and decoding circuit 26. FIG. 31 shows the display pulses produced by the X drive circuit 15 from the X drive data XA, XB and XC in FIG. 29 and applied to the liquid crystal panel 157. The comparison among FIG. 31, FIG. 18 and FIG. 24 leads to the same conclusion as the case of (A, B)=(0, 1).

The foregoing phase inverting and decoding circuit 26 rearranges the display information MA and MB read out of the line memories. An alternative, in accordance with the present invention, is to dispose the phase inverting and decoding circuit 26 at the front of the line memories so that it rearranges the A data and B data and creates a C data before introducing the data to the line memories. In this case, another line memory is needed for the C data, and therefore the number of memories is not reduced.

The above explanation of pulse width modulation has been directed to the cases where one horizontal period is equally divided into 2 and 3 parts. When the number of division n is increased, the number of levels of tone of display will be n+1 including blanking. However, as the value of n increases, the number of variation of display pulses due to the rising and falling transitions of display pulses also increases, causing the frequency component to go higher, and eventually the display brightness of the liquid crystal panel 17 is deteriorated or the occurrence of crosstalk increases. The following describes the multiple level tone display of the cases of n=2 and 3, in which the frequency component is relatively low.

The liquid crystal intermediate tone display system falls generally into two categories. One is the pulse width modulation system based on the pulse width of display pulses as employed in the above embodiments, and the other is an inter-frame reduction system in which display is controlled in units of several frames and the display brightness is determined from the number of displays in the several frames. For multiple level tone display based on the pulse width modulation of relatively low frequency component, one method is to reduce data, which selects a pulse width, in units of several frames. Namely, this is a combination of pulse width modulation and frame reduction. This system will be described, for example, with reference to FIG. 6 and FIGS. 32 to 37.

Figures 32, 33:
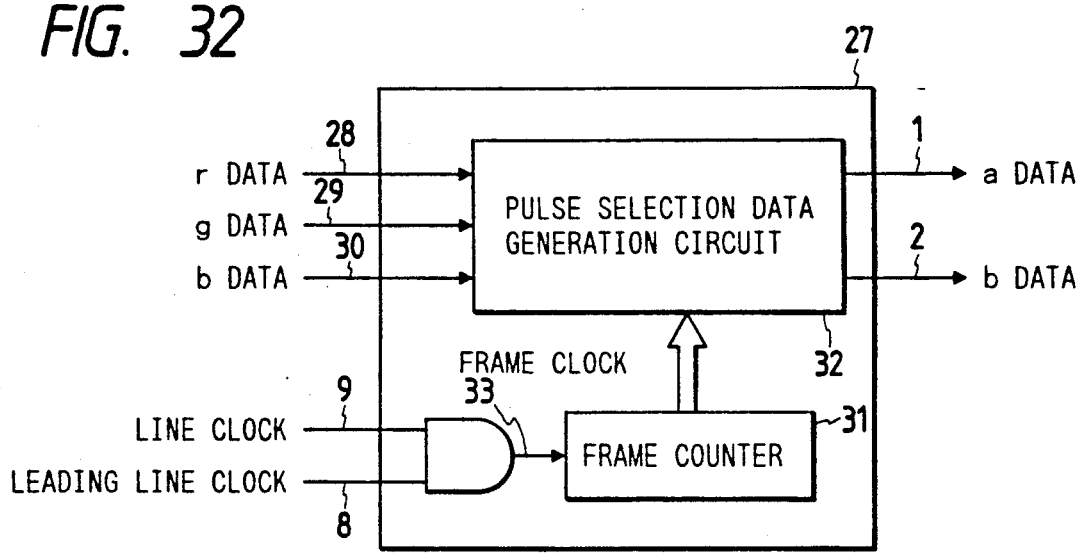
FIG. 32 is a schematic diagram of a data generation circuit in accordance with the present invention.
FIG. 33 is a diagram for explaining the data generation circuit of FIG. 32.
Figure 34:
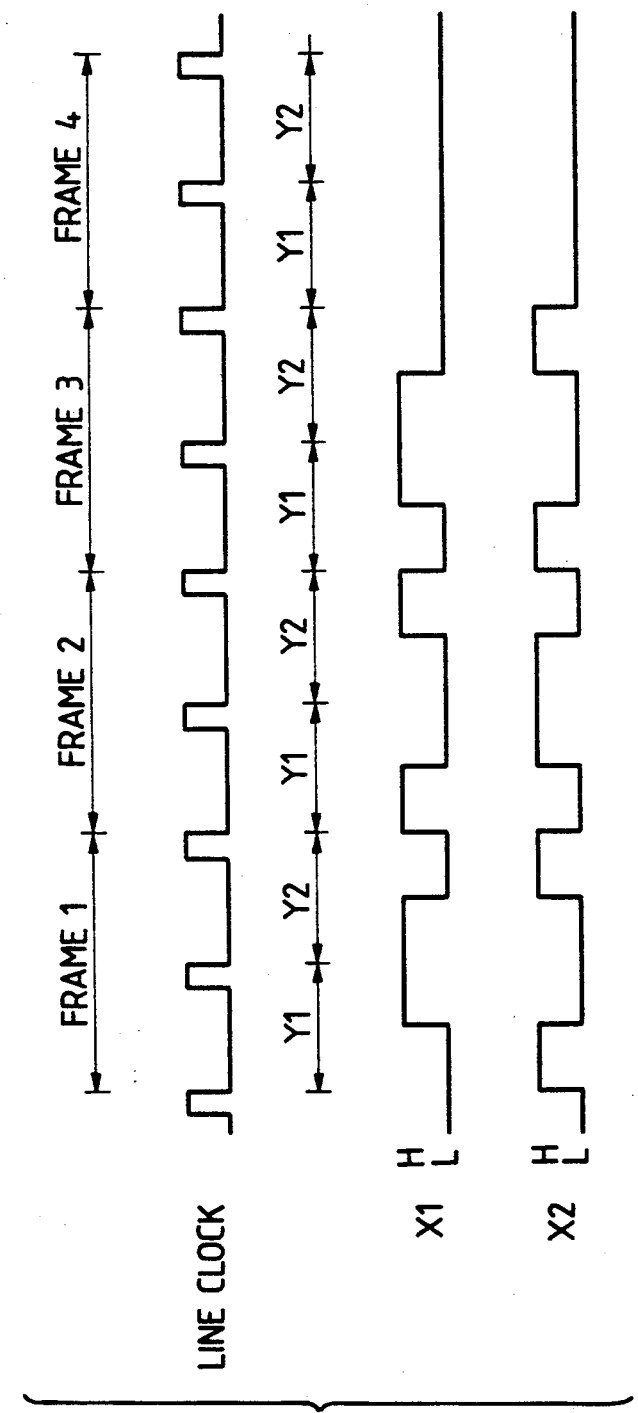
FIG. 34 is a diagram for explaining liquid crystal application display pulses produced by the data generation circuit of FIG. 32.

Color information represented, for example, by A data 1 and B data 2 in FIG. 6, are created by a data generation circuit 27 shown in FIG. 32. The data generation circuit 27 is given R data 28, G data 29 and B data 30. In the data generation circuit 27, a frame counter 31 counts 1 through 4 repeatedly in response to the frame clock 33 which is a logical product between the leading line clock 8 and line clock 9, and a pulse selection data generation circuit 32 decodes the count value, R data 28, G data 29 and B data 30 to produce A data and B data in accordance with the table shown in FIG. 33. The A data 1 and B data 2 are delivered to the X drive circuit 15 by way of the line memories, data selectors 12 and phase inverting circuit 13, and the liquid crystal application pulses to liquid crystal of one dot differs for colors indicated by the R data 28, G data 29 and B data 30 among frames, as shown in FIG. 34. FIG. 34 shows the display pulses applied to liquid crystal when a total of four dots including two dots X1 and X2 in the X direction and two dots Y1 and Y2 in the line direction are displayed with combination of 0, 1 and 0 for the R data 28, G data 29 and B data 33. FIG. 30 reveals that the combination of output A data and B data from the data generation circuit 27 resulting from the combination of R data 28, G data 29 and B data 30 are (0, 1), (0, 1), (0, 1) and (0, 0) for frame 1 to frame 4. On this account, the display pulse for the fourth frame exhibits "L". As shown in FIG. 6, data MA and MB read out of the line memories and selected by the data selector 12 are subjected to rearrangement for every frame, every line and every X dots by the phase inverting circuit 13, and consequently display pulses of adjoining X dots are different even though display data A and B are the same, as shown in FIG. 34, and the cancellation effect and frequency component ar reduced.

With the effective value of voltage which provides "H" in the entire 4-frame period being 8, each voltage specified by the display R data 28, G data 29 and B data 30 has an effective value of 0 for a combination of (0, 0, 0), a value of 2 for a combination of (0, 0, 1), a value of 3 for a combination of (0, 0, 1), . . . a value of 7 for a combination of (1, 1, 0), and a value of 8 for a combination of (1, 1, 1). Accordingly, eight kinds of effective values can be created, and it becomes possible for the liquid crystal panel 17 to have eight level tone display.

Figures 35, 36:
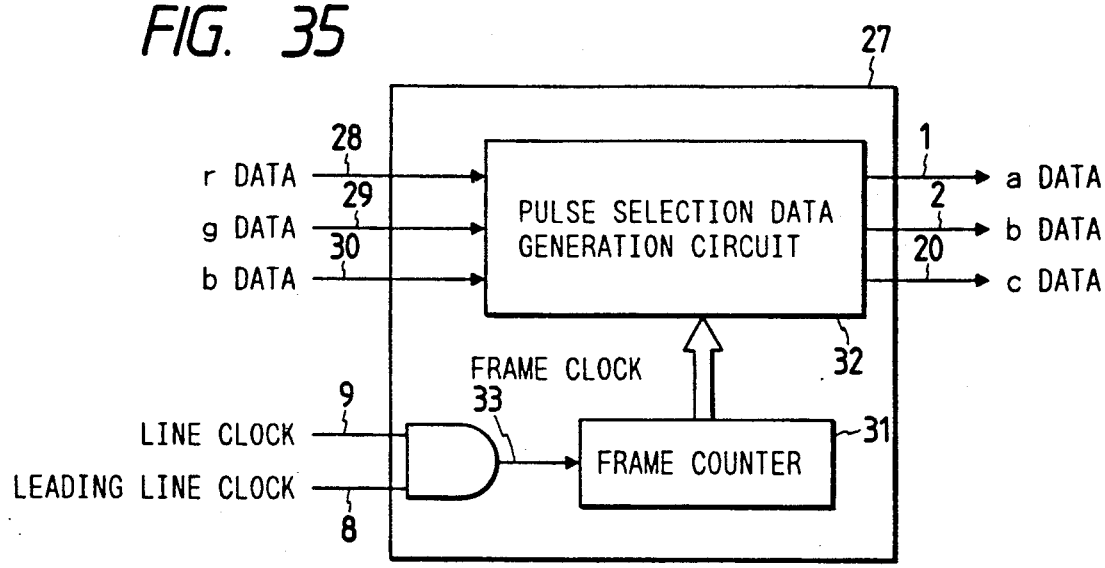

Next, a combined method based on the ⅓ pulse width modulation, which uses a pulse width derived from a horizontal period equally divided into three parts, and the inter-frame reduction system will be described. Input A data 1, B data 2 and C data 20 as, for example, shown in FIG. 19 are created by a data generation circuit 27 shown in FIG. 35. The data generation circuit shown in FIG. 32 includes a counter 31 which counts 1 through 3 repeatedly in response to the frame clock 33 and a pulse selection data generation circuit 32 which decodes the number of frames counted, R data 28, G data 29 and B data 30, and A data 1, B data 2 and C data 20 shown in FIG. 36 are created. Based on the A data 1, B data 2 and C data 3, the X drive circuit 15 applies display pulses to the liquid crystal panel 17 by way of the line memories, data selector 12, phase inverting circuit 25 and data selector 23. The liquid crystal application pulses are supplied so that the cancellation effect and frequency component fall concurrently as in the case of the ½ pulse width modulation. In the case of the ⅓ pulse width modulation, control takes place for a unit of three frames. With the effective value of the voltage which provides "H" for the entire three-frame period being 9, each effective voltage specified by the display R data 28, G data 29 and B data 30 has a value of 0 for a combination of 0, 0 and 0, a value of 2 for a combination of 0, 0, 1, . . . a value of 7 for a combination of 1, 1, 0, and a value of 9 for a combination of 1, 1, 1. Accordingly, eight kinds of different effective values can be created, and it is possible for the liquid crystal panel 17 to have eight level tone display.

In the case of the ⅓ pulse width modulation, a method of reducing the number of line memories is to confine data created by the data generation circuit 27 to two kinds including A data and B data, thereby reducing from three-series line memories to 2-series line memories. FIG. 37 shows A data 1 and B data 2 produced from the display R data 28, G data 29 and B data 30. The A data 1 and B data 2 shown in FIG. 37 are identical to the result of replacement from the three kinds of data including A data 1, B data 2 and C data 3 in FIG. 36 to data of two kinds. The effective value of each liquid crystal application voltage specified by the display R data 28, G data 29 and B data 30 has a value of 0 for a combination of 0, 0 and 0, a value of 2 for a combination of 0, 0, 1, . . . a value of 7 for a combination of 1, 1, 0 and a value of 9 for a combination of 1, 1, 1. Accordingly eight different effective values can be created, and it is possible for the liquid crystal panel 17 to have eight level tone display.

As described above, by combining a pulse width modulation system with a relatively low frequency component with the inter-frame reduction system which switches display pulse selection data for every frame, eight-level tone display is made possible.

In this embodiment, display data entered to the data generation circuit 27 are the R data 28, G data 29 and B data 30, and therefore there are only eight combinations of data, and as a result it merely performs eight level tone display. By increasing data, e.g., from 3-bit data to 4-bit data, entered to the data generation circuit 27, so as to increase the number of combinations of data, it becomes possible to carry out much higher-order multiple level tone display. Multiple level tone display is also possible by varying the value of n in dividing one horizontal period equally into n parts (n is an integer equal to or greater than 2).

In the foregoing, the data generation circuit 27 based on inter-frame reduction is provided at the front of the line memories to produce display information different for each frame. An alternative, in accordance with the present invention, is to provide the data generation circuit 27 next to the line memories so that data read out of the line memories are converted into display information different for each frame.

Although in the foregoing, line memories are used to store display information frame memories for introducing display information for one frame may be used in place of the line memories. In this case, K-series frame memories are required instead of K-series line memories (K=2 for display information A and B, or K=3 for display information A, B and C). The K-series frame memories are read out K times in one horizontal period.

The following describes the usage of this embodiment. In the circuit shown in FIG. 6, the X drive circuit 15 and Y drive circuit 16 are conventionally integrated with the liquid crystal panel 17. For practicing this embodiment using the liquid crystal panel 17, one method is to use circuits other than the X drive circuit 15, y drive circuit 16 and liquid crystal panel 17 may be utilized as a liquid crystal display controller (LSI). Since this embodiment serves to control the X drive circuit 15, circuits other than the Y drive circuit 16 and liquid crystal panel 17 as an integral part (LSI) of the X drive circuit 15.

The present invention effectively reduces the brightness degradation phenomenon on the liquid crystal display screen which is a problem in pulse width modulation, and reduces the occurrence of crosstalk through the provision of a phase inverting circuit which inverts data for selecting a pulse of pulse width modulation into data different for adjoining dots. Rearrangement of n-bit data for selecting a pulse of 1/n pulse width modulation by means of the phase inverting circuit necessitates line memories of n in number and the phase inverting circuit itself will be complex. However, the present invention also contemplated reduction of the number of line memories and simplification of the phase inverting circuit.

Moreover, by combining the pulse width modulation system with a relatively low frequency component with the inter-frame reduction system which switches display pulse selection data for every frame, multiple tone display can readily be accomplished.

While we have shown and described several embodiments in accordance with the present invention, it is understood that the same is not limited thereto but is susceptible to numerous changes and modifications as known to one of ordinary skill in the art, and we thereof do not wish to be limited to the details shown and described herein but intend to cover all such modifications as are encompassed by the scope of the appended claims.

What is claimed is:

1. A liquid crystal display apparatus comprising a liquid crystal panel of a plurality of dots, Y drive circuit means for selecting a line of the liquid crystal panel, line memory means for storing bits of information data to be displayed, the line memory means having a capacity at least equal to the total number of bits of information data of one line of the liquid crystal panel, each dot of the line of the liquid crystal panel having two bits of display information, phase inverting circuit means for rearranging two-bit display information supplied from the line memory means in a one dot-wise manner in an X direction and in a one line-wise manner in a Y direction, the phase inverting circuit means rearranging the two-bit display information on a one-half horizontal scanning period timing basis, selecting means for selecting one-bit of the two-bit display information supplied from the phase inverting circuit means, and X drive circuit means for receiving the selected one-bit display information form the selecting means and for outputting a signal in a dot manner on a one-half of the horizontal scanning period interval timing basis for the liquid crystal panel, whereby a dot of the liquid crystal panel is displayed in accordance with outputs of the X drive circuit means and the Y drive circuit means.

2. A liquid crystal display apparatus according to claim 1, wherein the phase inverting circuit means inverts the phases of the predetermined two-bit display information.

3. A liquid crystal display apparatus according to claim 2, wherein the phase inverting circuit means inverts the phases of the predetermined two-bit display information so that the outputted signal by the X drive circuit means for one dot of the line of the liquid crystal panel has a predetermined relationship with respect to the signal for adjoining dots in the one line of the liquid crystal panel.

4. A liquid crystal display apparatus according to claim 2, wherein the phase inverting circuit means inverts the phases of the predetermined two-bit display information so that the output signal of the X drive circuit means for the one dot of the one line of the liquid crystal panel is a pulse having rising and falling portions at a timing opposite to a falling and rising portion of the adjoining dots in the one line of the liquid crystal display panel.

5. A liquid crystal display apparatus according to claim 1, wherein the phase inverting circuit means rearranges the two-bit display information so that the output signal of the X drive circuit means for one dot has rising and falling portions in opposition to the corresponding rising and falling portions of adjoining dots at the same timing.

6. A liquid crystal display apparatus according to claim 1, wherein the line memory means comprises a plurality of line memories.

7. A liquid crystal display apparatus comprising a liquid crystal panel of a plurality of dots, Y drive circuit means for selecting a line of the liquid crystal panel, line memory means for storing bits of information data to be displayed, the line memory means having a capacity at least equal to the total number of bits of information data of one line of the liquid crystal panel, each dot of the line of the liquid crystal panel having N bits of display information, wherein N is an integer of at least 2, data converting circuit means for converting the N-bit display information supplied from the line memory means to M-bit display information, wherein N is an integer and $M \geq N$, phase inverting circuit means for rearranging M-bit information supplied from the data converting circuit means in an M dot-wise manner in a X direction and in an M line-wise manner in a Y direction, the phase inverting circuit means rearranging the M-bit display information on a 1/M of a horizontal scanning period timing basis, selecting means for selecting one-bit of the M-bit display information of each dot, and X drive circuit means for receiving one-bit display information from the selecting means and for outputting a signal in a dot manner on a 1/M of the horizontal scanning period interval timing basis for the liquid crystal panel, whereby the liquid crystal panel displays a dot in accordance with outputs of the X drive circuit means and the Y drive circuit means.

8. A liquid crystal display apparatus according to claim 7, wherein the phase inverting circuit means inverts the phases of predetermined M-bit display information.

9. A liquid crystal display apparatus according to claim 7, wherein the phase inverting circuit means inverts the phases of the predetermined M-bit display information so that the outputted signal by the X drive circuit means for M dots of the line of the liquid crystal panel has a predetermined relationship with respect to the signal for adjoining dots in the one line of the liquid crystal panel.

10. A liquid crystal display apparatus according to claim 7, wherein the phase inverting circuit means inverts the phases of the predetermined M-bit display information so that the output signal of the X drive circuit means for the M dots of the one line of the liquid crystal panel is a pulse having rising and falling portions at a timing opposite to a falling and rising portion of adjoining dots in the one line of the liquid crystal display panel.

11. A liquid crystal display apparatus according to claim 7, wherein the phase inverting circuit means rearranges the M-bit display information so that the output signal of the X drive circuit means for M dots has rising and falling portions in opposition to the corresponding rising and falling portions of adjoining dots at the same timing.

12. A liquid crystal display apparatus according to claim 7, wherein the line memory means comprises a plurality of line memories.

13. A liquid crystal display apparatus according to claim 7, wherein $N=2$ and $M=3$.

14. A liquid crystal display apparatus according to claim 7, wherein $N=3$ and $M=3$.

* * * * *